(12) United States Patent
Yorks

(10) Patent No.: US 7,181,146 B1
(45) Date of Patent: Feb. 20, 2007

(54) SELF-ADJUSTING DATA TRANSMITTER

(75) Inventor: Jason Yorks, Longmont, CO (US)

(73) Assignee: Optical Communication Products, Inc., Woodland Hills, CA (US)

( * ) Notice: Subject to any disclaimer, the term of this patent is extended or adjusted under 35 U.S.C. 154(b) by 1110 days.

(21) Appl. No.: 10/028,830

(22) Filed: Dec. 20, 2001

Related U.S. Application Data

(60) Provisional application No. 60/262,620, filed on Jan. 17, 2001.

(51) Int. Cl.
*H04B 10/04* (2006.01)

(52) U.S. Cl. ........................... 398/195; 398/25

(58) Field of Classification Search ........ 398/195–198, 398/25–28, 162
See application file for complete search history.

(56) References Cited

U.S. PATENT DOCUMENTS

| | | | | |
|---|---|---|---|---|
| 4,355,395 A | 10/1982 | Salter et al. | ................... | 372/38 |
| 5,019,769 A | 5/1991 | Levinson | ...................... | 372/31 |
| 5,396,059 A | 3/1995 | Yeates | ........................ | 250/214 |
| 5,488,621 A | 1/1996 | Slawson et al. | ............... | 372/31 |
| 5,546,325 A * | 8/1996 | Aulet et al. | .................. | 702/117 |
| 5,606,572 A | 2/1997 | Swirhun et al. | ............... | 372/96 |
| 5,717,510 A | 2/1998 | Ishikawa et al. | ............. | 359/161 |
| 5,754,322 A | 5/1998 | Ishikawa et al. | ............. | 359/135 |
| 5,774,242 A | 6/1998 | O'Sullivan et al. | ......... | 359/110 |
| 5,812,572 A | 9/1998 | King et al. | .................... | 372/38 |
| 5,815,294 A | 9/1998 | Ishikawa et al. | ............ | 359/110 |
| 5,870,213 A | 2/1999 | Ishikawa et al. | ............ | 359/135 |
| 5,894,362 A * | 4/1999 | Onaka et al. | ................... | 398/95 |
| 5,900,959 A * | 5/1999 | Noda et al. | .................. | 398/195 |
| 6,001,664 A | 12/1999 | Swirhun et al. | ............... | 438/31 |
| 6,021,947 A * | 2/2000 | Swartz | .................. | 235/472.01 |
| 6,445,471 B1 * | 9/2002 | Shimokawa et al. | .......... | 398/79 |
| 6,842,587 B1 * | 1/2005 | McGhan et al. | ............ | 398/201 |

* cited by examiner

*Primary Examiner*—Christina Leung
(74) *Attorney, Agent, or Firm*—Barlow, Josephs & Holmes, Ltd.

(57) ABSTRACT

A self-adjusting data transmitter driver can be used for transmission of analog or digital data signal over any suitable communication channel, such as, for example, optical, electrical, wireless and satellite. The optical transmitter driver may be used to drive a single laser as well as an array of lasers. An optical transmitter driver including a laser diode driver can be used to provide modulation and bias currents to drive a laser diode in an optical communication system. A high speed photodiode is used to monitor high frequency characteristics of the optical data signal while one or more photodiodes are used to detect source parameters of the optical data signal. To compute the feedback parameters, parameters including BER, data-eye, discrete optical data integrity parameters and discrete optical parameters are determined using the feedback detectors. The feedback parameters are used to adjust the optical quality of the laser output towards optimization.

35 Claims, 10 Drawing Sheets

SELF-ADJUSTING DATA TRANSMITTER

CROSS REFERENCE TO RELATED APPLICATION(S)

This application claims priority of the U.S. Provisional Patent Application Ser. No. 60/262,620 entitled "Self-Adjusting Data Transmitter" filed on Jan. 17, 2001, the contents of which are fully incorporated by reference herein.

FIELD OF THE INVENTION

The present invention is related to analog and/or digital communication systems, and more particularly to a self-adjusting data transmitter implemented on one or more integrated circuits.

BACKGROUND OF THE INVENTION

In communication systems, the bit error rate (BER) is typically used as a figure of merit for an overall link function of the system. The BER is typically defined to be a measure of the number of errors that occur out of the total number of bits that have been transmitted over some finite amount of time. The BER is a statistical probability number, which is typically related to a signal-to-noise ratio (SNR) of the voltage, current, or light amplitude logic level of a transmission data signal. The BER is typically also related to time phase (jitter) amplitude of the data signal.

The BER may be determined using a BER tester (BERT), which typically includes a pattern generator and a pattern receiver (error detector), or the BER may be determined by analyzing the integrity of a data-eye diagram, which may also be referred to as a data-eye. The data-eye diagram is typically formed by overlapping data bits that occur over a finite period of time on a display, e.g., an oscilloscope. The BER performance can typically be correlated to the number of measured oscilloscope samples that do not comply with a data-eye mask (or an eye mask). The data-eye mask is typically user-specified to define boundaries or limits within which each data bit of the data-eye should fall in the absence of a bit error.

During production of communication systems, parametric performance values (e.g., output to input amplitude ratio vs. time, frequency, or wavelength) of the transmitter are typically optimized individually, and combined with one another to derive an optimum link BER. The BER optimization of each link component, as well as the overall link BER optimization, is typically achieved using feedback adjustment (based on previous measurements). The feedback adjustment typically involves adjusting certain circuit values, which may be electrical and/or optical, of active and/or passive circuit elements. After the feedback adjustment, the BER performance of each link component, as well as the overall link, is typically re-measured using external laboratory test instrumentation.

In a fiber-optic production test environment (a specific example of optical communication application), an optical transmitter is typically tested with a calibrated set of link components under simulated worst-case ambient, power supply, and medium conditions. The optical transmitter typically includes a phase locked loop (PLL) based data multiplexing, retiming, or repeating circuit, a laser diode driver (LDD), and a laser diode. The link components typically include fiber optic connector and cable, coupling optics, and an optical-to-electrical (O/E) converter. The link components typically are combined to form a looped data path connecting the calibrated pattern generator of a BERT system to the calibrated Error Detector of the same BERT system to test for the transmitter BER performance.

It is typically time-consuming and expensive to implement measurement and optimization functions for BER, data-eye, and any or all of the discrete parameters across all ambient, power supply, and medium, worst-case combinations. For example, it is often costly to build temperature control chambers and instrumentation that is designed to enable a human user to run the measurement and optimization procedures. Such systems often have much of their cost in the human-interface components (e.g., keypads, information display, and user interface software) In addition, it is often time-consuming to run man-in-the-loop tests over all worst-case combinations of ambient, power supply and medium characteristics. Further, it is often difficult to adjust the parameter values during operation in the field when changes to ambient and other conditions make such adjustments desirable.

SUMMARY

In an exemplary embodiment according to the present invention, a transmitter for transmitting a data signal is provided. The self-adjusting transmitter includes a driver circuit, a transmitter, first and second sensors and a processor. The driver circuit is for generating a drive signal, in which the driver circuit is capable of adjusting the drive signal in response to at least one feedback signal. The transmitter is for receiving the drive signal and for generating the data signal in response to the drive signal. The first sensor is capable of detecting the data signal to generate a first signal containing a first characteristic. The second sensor is capable of detecting the data signal to generate a second signal containing a second characteristic. The processor is for receiving at least one of the first and second signals, for generating said at least one feedback signal in response to the first and second characteristics, and for providing said at least one feedback signal to the driver circuit.

In another exemplary embodiment according to the present invention, a method of adjusting signal quality of a data signal provided by a transmitter is provided. A drive signal is generated, and the data signal is generated in response to the drive signal. The data signal is split into at least first and second data signal portions. A first signal containing a first characteristic is generated by detecting the first data signal portion, and a second signal containing a second characteristic is generated by detecting the second data signal portion. At least one feedback signal is generated in response to the first and second characteristics, and the drive signal is adjusted in response to said at least one feedback signal.

In yet another exemplary embodiment according to the present invention, a method of adjusting optical quality of a laser diode output is provided. First and second feedback data signals are extracted from the laser diode output. High frequency characteristics of the laser diode output are detected from the first feedback data signal. Laser source characteristics of the laser diode output are detected from the second feedback data signal. A feedback adjustment signal is provided to adjust the optical quality of the laser diode output.

BRIEF DESCRIPTION OF THE DRAWINGS

These and other aspects of the invention may be understood by reference to the following detailed description, taken in conjunction with the accompanying drawings, which are briefly described below.

DETAILED DESCRIPTION

I. Overview

In an exemplary embodiment of the present invention, the commonly used test methods, which typically involve humans or predefined programmable firmware within an instrument or external microprocessor, are combined and implemented as a feedback network within a self-adjusting transmitter driver of a data transmitter. The self-adjusting transmitter driver may be further combined with external active or passive, electrical or optical components to improve signal characteristics of the data transmission signal.

Therefore, improvement processes based on human, manual and/or automated user-defined feedback is implemented within a self-adjusting transmitter driver, thus reducing the need for instrumentation based optimization measurements of the data path. This way, the process of adjusting the bit error rate (BER), the data-eye and the discrete parameters used to derive a correlated BER and the data-eye can be automated.

Conventional methods and apparatus for measuring, adjusting and analyzing the BER, the data-eye and discrete parameters (one or more of which may be used together to derive the BER and/or the data-eye) are generally known to those skilled in the art. In particular, the following four books and publications, which are fully incorporated by reference herein, discuss the BER, the data-eye and the discrete parameters: 1) David Cunningham et al., *Gigabit Ethernet Networking*, Macmillan Technology Series, Pearson Higher Education, 1999; 2) Dennis Derickson, *Fiber Optic Test and Measurement*, Hewlett-Packard Company, Prentice Hall PTR, 1998; 3) "OFSTP-4-A Optical Eye Pattern Measurement Procedure (ANSI/TIA/EIA-526-4-A-97)", TIA/EIA-526-4-A, Nov. 1, 1997; and 4) "Fibre Channel Jitter Working Group Technical Report", REV 10, Jun. 9, 1999.

II. Self-Adjusting Transmitter Driver

Figure 1:
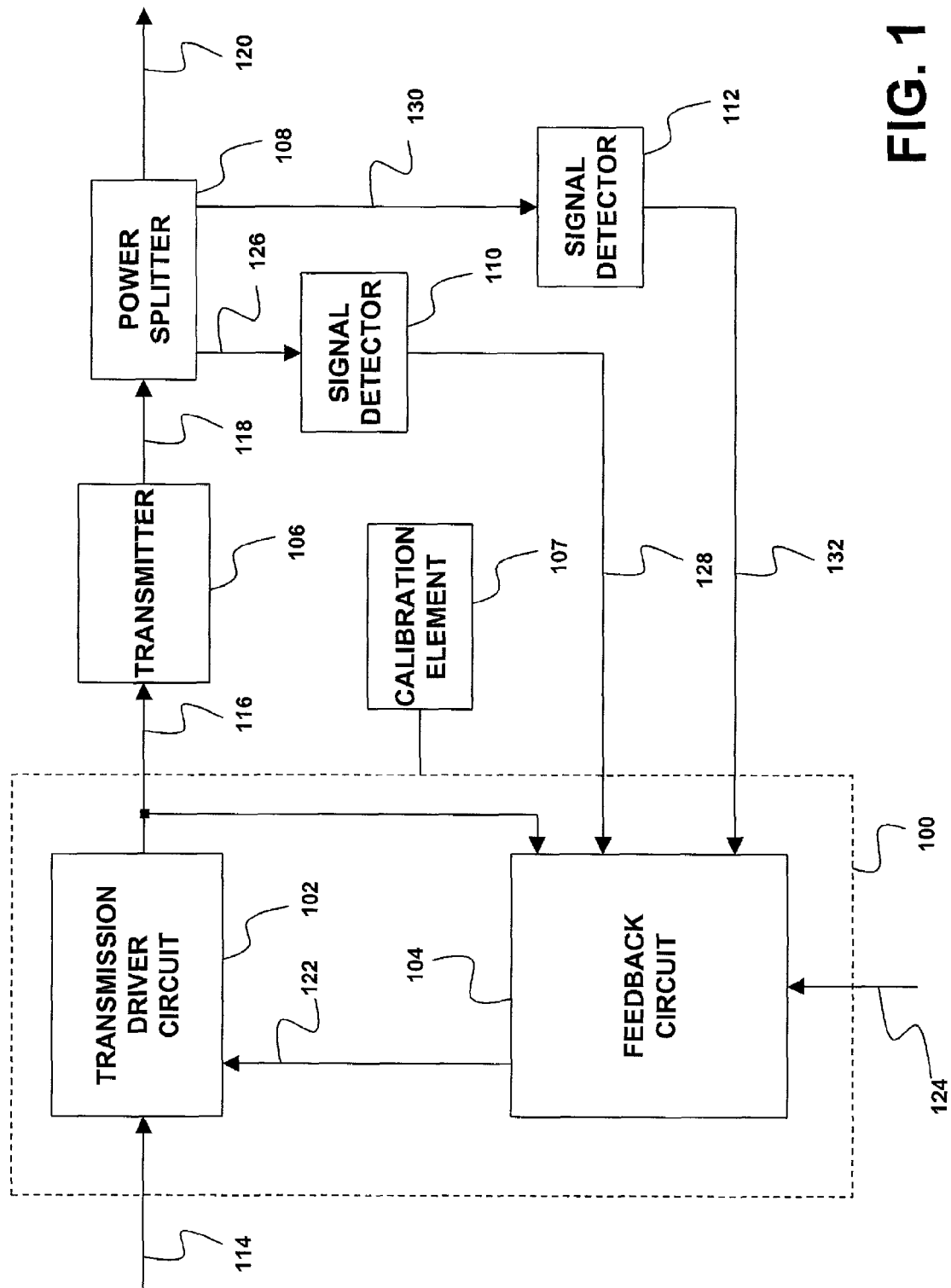
FIG. 1 is a block diagram of a self-adjusting transmitter driver, coupled to other transmission circuitry, in an exemplary embodiment of the present invention.

FIG. 1 is a block diagram of a self-adjusting transmitter driver 100 in an exemplary embodiment of the present invention. The transmitter driver 100 includes a transmission driver circuit 102 and a feedback circuit 104. The transmission driver circuit 102 and the feedback circuit 104 may be implemented on a single integrated circuit chip as discussed more fully below, or they may be implemented on two or more integrated circuit chips. The transmission driver circuit 102 receives transmission data 114, processes (e.g., modulates) the transmission data and provides a drive signal 116 to a transmitter 106. In other embodiments, the transmission driver circuit may generate the transmission data therewithin.

The feedback circuit 104 receives the drive signal 116 and feedback signals 128, 132, and uses these signals to generate a feedback signal 122 to adjust the signal characteristics of the drive signal, for improving the quality of a transmit signal 118 transmitted by the transmitter 106, for example, by improving the BER, the data-eye, and/or the discrete parameters used to derive the BER and/or the data-eye. The transmit signal 118 may include any electromagnetic signal including one or more of radio frequency (Rf) signal, optical signal, microwave signal, and any other signal suitable for data transmission. The transmit signal 118 may be an analog or digital signal generated using one or more of a various modulation/encoding schemes known to those skilled in the art.

The feedback circuit 104 also receives a user-defined signal 124. The user-defined signal 124 may, for example, include one or more of specification (e.g., multi-source agreement or industry standard) information, transmission medium characteristics, receiver characteristics and any other information pertaining to the communication system. The user-defined signal may be loaded into the feedback circuit during system production or calibration, during system start-up and/or during system operation in the field.

The transmit signal 118 may be split into a number of lower-powered signals by a power splitter 108. The power splitter 108 transmits a lower-powered transmit signal 120 over a communication medium. Depending on the type of the transmit signal, the communication medium may include, but is not limited to, one or more of a fiber optic channel, free space (which may include vacuum), and electrical transmission lines.

In the exemplary embodiment, the power splitter also provides lower-powered feedback portions 126 and 130 of the transmit signal 118 to signal detectors (sensors) 110 and 112, respectively. Each signal detector may be used to detect a single feedback portion or multiple feedback portions. For example, the signal detector 112 may include a number of signal detectors organized into a one-dimensional or multi-dimensional array to detect multiple feedback portions of the transmit signal 118. When the transmitter 106 includes an optical transmitter, the signal detector 112 in an array form may include one or more of, but is not limited to, lenses, splitters, wavelength filters, wavelength diffraction gratings for various optical temporal intensity mapping and wavelength identification, PIN photodiodes, avalanche photodiodes, and/or charge coupled devices (CCD) of various capacitance, leakage current, and responsivity.

The signal detectors 110, 112 provide the feedback signals 128, 132, respectively, to the feedback circuit 104. The self-adjusting transmitter driver 100 may also be coupled to a calibration element 107. The calibration element may be used to calibrate the feedback circuit so as to provide a reference when the feedback circuit is used to derive parameter values from the feedback signals 128 and 132. For example, the calibration element may include a resistor whose characteristics over varying ambient conditions are known.

From here on, for illustrative purposes, the self-adjusting transmitter driver will be described in reference to an optical transmitter driver. However, it is to be understood that the optical transmitter driver represents an exemplary embodiment only, and the present invention may be broadly applied to other types of data transmission systems such as cellular, wireless, satellite communication systems or any other suitable communication systems.

When the self-adjusting transmitter driver 100 is used to drive an optical transmitter, i.e., the transmitter 106 is an optical transmitter, the drive signal 116 typically is an electrical data signal used to drive the transmitter 106, and the transmit signal 118 typically includes an optical output signal of the transmitter 106. In this case, the signal detectors 110 and 112, respectively, generate electrical feedback signals 128 and 132 from the optical transmit signal 118. The transmitter profile and/or driver characteristics may be ascertained through analyzing and understanding the differences between the electrical drive signal 116 and the optical transmit signal 118.

The self-adjusting transmitter driver 100, the transmitter 106 and/or the signal detectors 110, 112 may be fabricated on the same semiconductor substrate. In particular, they may be fabricated using a gallium arsenide (GaAs)-based fabrication process that can be combined with indium (Id), phosphorus (P), antimony (Sb), nitrogen (N), etc. For example, the transmitter 106 may comprise a vertical cavity surface emitting laser (VCSEL) and the signal detectors 110, 112 may comprise PIN diodes. The fabrication and functionality of VCSELs and PINs grown on the same substrate is disclosed in the commonly-owned U.S. Pat. No. 5,606,572 entitled "Integration of Laser with Photodiode for Feedback Control" and U.S. Pat. No. 6,001,664 entitled "Method for Making Closely-Spaced VCSEL and Photodiode on a Substrate," the contents of both of which are fully incorporated by reference herein.

III. Optical Transmitter Driver

Figure 2:
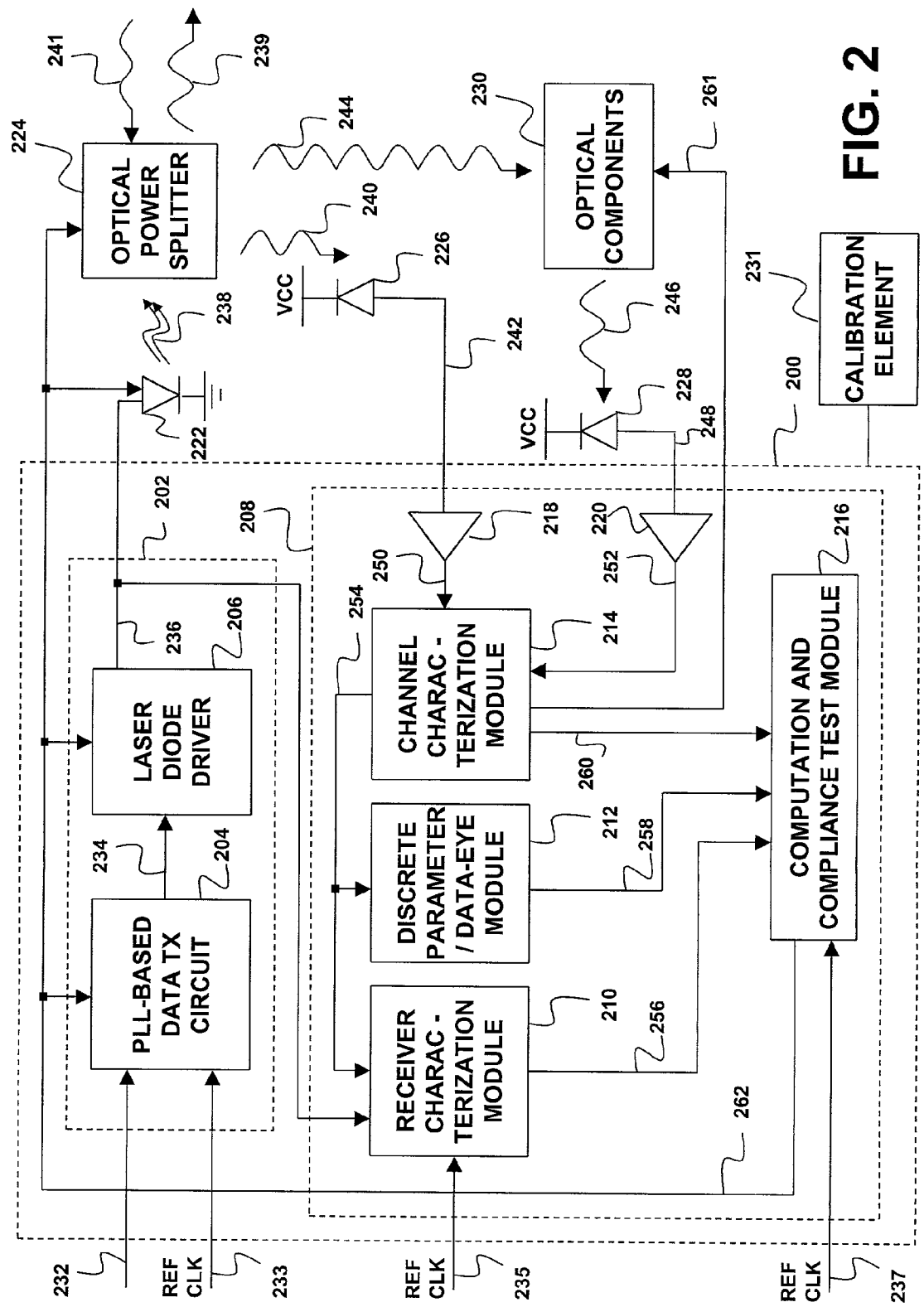
FIG. 2 is a block diagram of an optical transmitter driver, coupled to other optical transmission circuitry, in an exemplary embodiment of the present invention.

FIG. 2 is a block diagram of an optical transmitter driver 200, coupled to other optical transmission circuitry, in an exemplary embodiment of the present invention. The optical transmitter driver 200 may represent, for example, a more detailed illustration of the self-adjusting transmitter driver 100 of FIG. 1, when the self-adjusting transmitter driver 100 is for optical transmission applications. The optical transmitter driver 200 may be implemented on a single integrated circuit chip or on multiple integrated circuit chips.

The optical transmitter driver 200 is self-adjusting in a sense that it internally tests for its output parameter values and their correlation to a user-defined BER, data-eye mask, and/or all or subset of discrete parameters as specified in a particular specification (e.g., multi-source agreement or industry standard). The optical transmitter driver 200 incorporates correlation factors to user-defined calibrated components for normalization against a specification along with electrical sampling and computation capability of an instrument such as a BERT or oscilloscope with data-eye mask compliance testing capability. The optical transmitter driver 200 also combines the correlation factors with programmable software (e.g., firmware programmed into the optical transmitter driver) feedback capability.

Thus, the optical transmitter driver includes one or more of oscilloscope or time interval analyzer functions to identify the discrete parameters and data-eye mask. The optical transmitter driver also includes BERT functions so that the BER may be extrapolated and approximated mathematically from the parameters, the data eye mask and/or from a receiver characterization module 210 in the optical transmitter driver 200. A BERT Scan (generate bathtub curve) may be used to discriminate between random jitter (RJ) and deterministic jitter (DJ) contribution instead of implementing oscilloscope measurement methodologies.

Using the integrated test sampling and feedback features, the optical transmitter driver 200 may reduce one or more of production test requirements, physical and financial infrastructure, production test time (e.g. at various temperatures, power supply values, and medium such as fiber optic cable and connectors), and test margin yield loss. The optical transmitter driver may self-adjust its overall BER performance (during use within a specified application) at any combination of pre-programmed medium characteristics (e.g. connector loss, fiber attenuation and dispersion coefficients) and sensed ambient temperature, humidity, vibration, or power supply condition to improve the BER performance, the data-eye, and/or other parameter values.

The optical transmitter driver 200 is capable of receiving and storing into memory a set of defined and programmed (firmware) discrete parameters, data-eye mask, and/or BER specification limits. The specification limits may include one or more of the predicted, desired receiver (RX) sensitivity, overall link model BER and correlated data eye mask with reference to the calibrated monitor detector (MD), monitor TIA (MTIA) and monitor CDR (MCDR), based on the computed values of one or more of the discrete, constituent TX (transmitter) data path output parameters (e.g. data pattern dependent inter-symbol interference, which may be deterministic).

The optical transmitter driver 200 includes a transmission driver circuit 202 and a feedback circuit 208. The transmission driver circuit 202 includes a PLL-based data transmission circuit 204 and an LDD 206. The PLL-based data transmission circuit generates a data pattern and clock to be transmitted at a data rate based on a phase locked loop (PLL). The PLL-based data transmission circuit 204 receives a reference clock signal 233 for frequency and/or phase detecting/tracking. The reference clock input 233 may, for example, be from the same clock source as reference clock signals 235 and 237. In other embodiments, the reference clock signals may be generated from within the optical transmitter driver 200.

The PLL-based data transmission circuit 204 may include one or more of PLL-based data multiplexer (e.g., clock multiplier unit), PLL-based retimer and/or PLL-based repeater. Design, fabrication and use of the PLL-based data multiplexer, PLL-based retimer and PLL-based repeater are well known to those skilled in the art. In other embodiments, the PLL-based data transmission circuit may include any other suitable circuit designed to receive transmission data 232 and to provide a transmission data signal 234 to the laser diode driver 206.

The LDD 206 uses the received transmission data signal 234 to generate a drive signal 236. The drive signal 236 is provided to a laser diode 222 and to the feedback circuit 208. The laser diode 222, in response to the drive signal, generates an optical data signal 238 that contains the transmission data 232. The drive signal 236 includes a bias current (Ibias) and a modulation current (Imod) to control average power and modulation depth, respectively, of the optical data signal 238. The drive signal 236 also includes a rise time peaking (pk+) current, a fall time peaking (pk−) current and a duty cycle distortion (DCD) current.

In an exemplary embodiment of the present invention, tradeoffs between high speed parameters of the PLL-based data transmission circuit 204 and high speed parameters of the LDD 206 may be adjusted so as to generate the drive signal 236 that may result in an optimum laser output quality. In other words, since both the PLL characteristics and the LDD characteristics affect the optical output quality of the laser diode 222, the PLL characteristics and/or the LDD characteristics may be adjusted individually and/or jointly to improve the optical output quality towards optimization.

For example, the reference clock 233 may contain jitter that may be passed on to the laser diode driver 206 in the transmit data signal 234, which may then be passed on to the laser diode 222 in the drive signal 236. In that case, the bandwidth of the PLL may be decreased, e.g., using the low pass filter in the PLL, so as to filter out the jitter. Thus, degradation of optical quality caused by jitter in the reference clock may be reduced by decreasing the PLL bandwidth.

However, when the optical quality is degraded due to Relative Intensity Noise (RIN) in the laser diode, as determined by analyzing the optical parameters, decreasing the PLL bandwidth probably does not improve the optical quality as could be achieved by other means. Moreover, for example, when the PLL-based data transmission circuit 204 includes a repeater, it is typically not desirable to decrease the PLL bandwidth since the repeater should track the received transmission data 232 to the greatest extent possible. It may also be undesirable to decrease the PLL bandwidth when the PLL-based data transmission circuit 204 includes a multiplexer or a retimer. Therefore, when excessive RIN is the problem, decreasing the PLL bandwidth may not be desirable. Instead, the bias current provided by the LDD 206 may improve the optical quality of the laser diode output, since higher bias currents typically tend to decrease RIN in the optical output.

An optical power splitter 224 receives the optical data signal 238, and splits the optical data signal into an optical data signal 239 and lower-powered optical signals 240 and 244. The optical power splitter 224 may include one or more of, but is not limited to, an optical reflective or refractive splitter, lens, filter, and/or grating network for reflecting or refracting the optical data signal.

The optical power splitter 224 may also include active optical components, such as, for example, micro electromechanical system (MEMS)-based filter, grating and/or isolator. The optical power splitter 224 may further include other active optical components, such as, for example, electro-absorption modulator (EAM) and/or electro-optic modulator (EOM).

In other embodiments, a second laser diode (LD) (not shown) may directly transmit a lower-powered optical signal to the optical components 230. The optical signal may also be transmitted partially through the substrate of the LD (e.g., vertical cavity surface emitting laser (VCSEL)) where the substrate is the opposite mirror of the LD's output mirror.

The optical power splitter 224 transmits the optical data signal 239 over an optical transmission medium to an optical receiver (not shown) which may include, for example, a receiver diode (RD). The optical transmission medium may include any combination of passive and/or active optical elements that function as an "optical waveguide system" (OWS) by which the light transcends from the optical power splitter 224 to the optical receiver. The optical elements in the OWS may include one or more of, but are not limited to, connectors, optical switches, optical multiplexers/couplers, demultiplexers/gratings, and Erbium-doped fiber amplifiers (EDFA).

The optical power splitter 224 also provides the lower-powered optical signal (partial serial optical data) 240 to a monitor detector (MD) 226 which may include, for example, a semiconductor photodiode. The MD 226 should be capable of operating at high frequency with sufficient bandwidth for capturing high frequency characteristics (e.g., modulation) of the optical data signal.

With the high frequency characteristics available, all parameters, including the high-speed parameters, may be optimized and/or traded-off. Thus, by capturing and analyzing high frequency characteristics of the optical data signal, the improved (or better) bit error rate may be achieved compared to when the high frequency characteristics are not available when, for example, a monitor detector without sufficient bandwidth is used. The improvement of the BER performance towards optimization may improve optical quality of the optical data signal towards optimization.

The MD 226 converts the received lower-powered optical signal 240 to an electrical data signal 242. The electrical data signal 242, typically a current signal, is provided to a transimpedance amplifier (TIA) 218 for conversion to a corresponding voltage data signal 250. The TIA 218 should have high linearity characteristics, and should be capable of working with a high frequency MD.

In other embodiments, the MD 226 may comprise an array of high speed and low noise photodetectors for detecting lower-powered optical signals generated by power-splitting outputs of an array of lasers (e.g., vertical cavity surface emitting lasers (VCSELs). Further, the TIA 218 may comprise an array high speed TIAs. Thus, the optical transmitter driver 200, which may be implemented on a single integrated circuit chip, may be mapped across an array of lasers. Using this array of high speed photodetectors and TIAs, optical crosstalks between different channels of a laser array may be monitored in addition to capturing high frequency characteristics of the lasers.

The optical power splitter 224 also provides the lower-powered optical signal 244 to optical components 230. The lower-powered optical signal 244 may include one or more split optical signals. The optical components 230 may include passive optical components, such as, for example, one or more filters, one or more gratings and one or more polarizers. The optical components 230 may also include an active optical component(s), such as, for example, a micro electromechanical system (MEMS)-based device such as filter, grating and/or isolator. In such cases, the MEMS-based device in the optical components 230 may receive a voltage signal 261 from the channel characterization module 214 for its adjustment.

The optical components 230 process the lower-powered optical signal 244 to enable analysis of various discrete optical parameters, which may include, but are not limited to, one or more of center wavelength ($\lambda c$), spectral width ($d\lambda rms$), sidemode suppression ratio (SMSR), polarization, modal noise (MN), mode partition noise (MPN), chirping and relative intensity noise (RIN), beam divergence angle ($\Delta\theta$) and optical return loss (ORL).

In particular, ORL may be derived using an optical reflection signal 241. The optical reflection signal 241 is a portion of the optical data signal 239, which portion has been reflected back by the optical transmission medium. At least a portion of the optical reflection signal 241 may be included in the lower-powered optical signal 244, and may be detected by the optical components 230. A portion of the optical reflection signal 241 may also be provided to the laser diode 222 for bias and/or modulation scheme to adjust laser diode optical output characteristics, such as, for example, wavelength and/or intensity of the optical output.

In practice, the optical transmission medium may have an optical isolation in a forward data path so that the optical reflection signal 241 substantially does not reach the laser diode 222. The optical reflection signal 241, for example, may be monitored by the monitor diode 226 and/or an optical detector 228 to measure attenuation/loss and/or dispersion coefficients, so that the optical transmitter driver 200 may be alerted when these values are outside the respective ranges allowed (predetermined or programmed) for the optical communication system.

For example, a data-eye of the optical reflection signal 241 may be generated. This data-eye of the optical reflection signal 241 may be compared against the data-eye of the optical data signal 239 to determine the data-eye of the optical data signal 239 as detected at the receiver end, which information may be used to adjust the drive signal 236 to improve the optical communication system operation towards optimization.

The aforementioned discrete optical parameters, which may indicate degeneration of the laser source, may be used to emulate channel degeneration, such as, for example, noise degeneration of the signal-to-noise ratio (SNR).

The noise degeneration of the SNR for voltage, current, or light "amplitude" state level contains "random noise" sources such as resistors (thermal), current through semiconductor junctions (shot), and variation in a volume of material or volume of medium charge density (flicker, surface, burst).

The signal degeneration of the SNR for voltage, current, or light amplitude state level contains deterministic (in combination with random jitter for total jitter) sources, such as, for example, one or more of the following: 1) electrical and/or optical attenuation due to medium (wavelength and polarization independent or dependent) loss; 2) electrical and/or optical reflection due to medium (wavelength and polarization independent or dependent) mismatches; 3) electrical and optical dispersion due to medium wavelength and/or polarization dependent modal velocity variation; 4) electrical and optical dispersion due to spatial multi-mode propagation where different modes travel different path lengths within medium; 5) electrical electromagnetic interference (EMI); 6) electrical and optical crosstalk; 7) electrical power supply modulation; and 8) electrical (DC and AC coupled) and optical logic level (average power, extinction ratio, optical modulation amplitude, etc.) variation due to data pattern dependency of all of the above noise and signal degeneration constituents.

EMI, crosstalk, power supply variation, and data pattern dependency may all be classified as classical amplitude modulation (AM) that also translates into frequency and/or phase modulation timing noise jitter. Data pattern dependency may be represented by an example of induced inter-symbol interference (ISI) within a digital communication signal that has a pattern of many logical 1's followed by a 0/1 set of transitions where the threshold for the zero level detection is not achieved due to system charging effects after long run-length of 1's (i.e., due to drooping). Any electrical charge, electrical-optical generation-recombination, or temperature dependent constituent mentioned above (signal and noise) has for its magnitude a time based data pattern dependency.

The noise degeneration of the SNR for threshold transitioning between states, "timing" noise (jitter), may include all the above mentioned random voltage, current, or light logic amplitude noise constituents that occur within the time domain where one signal state is transitioning to a different signal state. The signal degeneration of the SNR for timing jitter may include all the above mentioned dispersion and AM factors contributing to deterministic voltage, current, or light logic amplitude degeneration constituents within the time domain where one logical signal state is transitioning to a different logical signal state plus any deterministic voltage, current, or light time modulation sources converted to frequency modulation (FM) and phase modulation (PM).

The optical components provide a processed optical signal 246 to an optical detector 228 that converts the processed optical signal to an electrical data signal 248. The optical detector 228 may include a PIN diode or an array of PIN diodes. Each PIN diode in the array may be used to detect a processed split optical signal when the lower-powered optical signal 244 includes multiple split optical signals. The optical detector 228 may also include a charge-coupled device (CCD) or other imaging array to detect multi-dimensional pattern of the processed optical signal 246. A spatial CCD array may be used, for example, to capture beam profile.

The optical detector 228 provides the electrical data signal, typically a current signal, to a TIA (or TIA array) 220 to be converted to a corresponding voltage data signal 252. The TIA array may have a combination of AGC, dynamic range, power supply rejection, common mode rejection, shot and thermal noise, duty cycle distortion, nonlinear phase response of various deterministic and random signal degeneration and noise generation.

In other embodiments, the array of optical detectors (e.g., PIN diodes) and the TIAs may be used to detect lower-powered signals from an array of lasers (e.g., VCSELs). In these embodiments, the optical components 230 may process the lower-power optical signals to enable analysis of various discrete optical parameters, such as for example, $\lambda c$, $d\lambda rms$, SMSR, MN, MPN, chirping, RIN, $\Delta\theta$ and/or ORL for each laser in the array. Further, optical crosstalks between laser channels may also be analyzed using the array of optical detectors and TIAs.

The feedback circuit 208 of this embodiment includes a receiver characterization module 210, a discrete parameter/data-eye module 212, a channel characterization module 214 and a computation and compliance test module 216. In addition, the feedback circuit includes transimpedance amplifiers (TIAs) 218 and 220, either or both of which may include an array of TIAs. The feedback circuit 208 may substantially constantly self-monitor and improve the system performance by trading-off all parameters, data-eye mask, and BER compliance margins against user-defined requirements (e.g., performance limits).

Voltage data signals 250, 252 may be provided as feedback signals for parameter, data-eye mask, and/or BER optimization with regards to the memory-based specified limits. To meet calibration requirements, the optical transmitter driver 200 may also be coupled to a calibration element 231, which may or may not be on the same integrated circuit as the optical transmitter driver 200.

The calibration may be based on an external (off chip) electrical reference to the calibration element, such as, for example, high tolerance passive device (e.g. resistor, capacitor, inductor), active device or circuit (e.g. single transistor, amplifier, oscillator), set voltage or current, or any combination thereof. The calibration may also be based on an external optical reference to the calibration element, such as, for example, a high tolerance passive device (e.g. filter, grating, splitter), active device (e.g. photodiode, phototransistor, LED, or LD), or any combination thereof. For example, the calibration element 231 may be used to continuously calibrate the MD 226, the optical detector 228 and/or one or more of the optical components 230.

The voltage data signals 250 and 252 are provided to the channel characterization module 214 in the feedback circuit 208. The channel characterization module 214 is used to emulate the channel (or transmission medium) between the laser diode 222 and the optical receiver at the other end of the channel so that meaningful feedback information may be provided to the transmission driver circuit 202. The channel characterization module 214 uses the emulated channel characteristics to degenerate the voltage data signal 250. A degenerated voltage data signal 254 is provided to the receiver characterization module 210 and the discrete parameter/data-eye module 212, respectively, to enable meaningful determinations of BER compliance, discrete optical data integrity parameters compliance and eye mask compliance.

In the exemplary embodiment, the channel characterization module 214 also determines values for the discrete optical characteristics, which may include one or more of, but are not limited to, $\lambda c$, $d\lambda rms$, SMSR, polarization, MN, MEN, $\Delta\theta$, ORL, chirping and RIN. The TIA 218 should have higher bandwidth and lower noise than the receiver TIA (RTIA) at the receiving end to provide high frequency characteristics (e.g., linear translation of modulation information) of the optical data signal 238 to allow determination of the discrete high speed optical data parameters. Compensation for a lack of higher TIA bandwidth and/or lower noise can be implemented by means of equalization. Thus, the voltage data signal 250 may include substantially ideal translation of the optical data signal 239, which is transmitted over the transmission medium.

The calculated discrete optical characteristics are combined with user-defined (e.g., firmware) equations and constants, which include degeneration profile provided by the voltage data signal 252, to determine the channel characteristic degeneration profile that determines the degenerated voltage data signal 254 based on the voltage data signal 250. For example, the voltage data signal 252 may include information on how much attenuation is to be applied to the voltage data signal 250 to generate the degenerated voltage data signal 254. In this embodiment, the degenerated voltage data signal 254 and the voltage data signals 250, 252 are electrical signals. Other types of signals may be used in other embodiments.

When the voltage data signal 250 includes nearly ideal translation of the transmitted data, the channel characterization module 214 is capable of emulating the actual channel/receiver degeneration profile without significant pre-distorted, uncompensated offset. In other words, all degeneration of data is provided by the channel characterization module 214 and not by the TIA 218. The channel characterization module 214 provides discrete optical parameters 260 to the computation and compliance test module 216 for one or more of post processing, specification ("spec") compliance testing, and computation of feedback parameters. When the optical transmitter driver 200 is used to drive an array of lasers, the computation and compliance test module 216 may perform these functions and provide feedback parameters for each laser channel.

The optical transmitter driver may be programmed towards optimization for its performance to pass for both data feedback paths' user-specific and standard defined compliances. In other embodiments, the optical transmitter driver may be programmed to degenerate some data path specifications, even to the point of failing their parameter, data-eye mask, and/or BER compliance in order to attain substantial optimization for a specific set of user-specific or standard-defined compliance.

For example, an assumption may be made that the optical transmitter driver has been programmed with a set of specification compliance limits A and B that it should constantly monitor. The optical transmitter driver may optimize itself to have maximum margin for passing both A and B at the same time, passing A with extra margin over the case for passing both and failing B, or passing B with extra margin over the case for passing both and failing A. It should be noted that each feedback data path is capable of including one or more sets of compliance filter(s) (e.g., a medium's defined attenuation and dispersion coefficients for degradation combined with compliance monitoring of a defined data eye mask) for a different custom or industry standard.

In the exemplary embodiment, the discrete parameter/data-eye module 212 receives the degenerated voltage data signal 254, and uses it to determine values for the discrete optical data integrity parameters and the data-eye diagram. The discrete optical data integrity parameters may include one or more of, but are not limited to, average power ($P_{ave}$), extinction ratio (ER), optical modulation amplitude (OMA), rise and fall times, overshoot and undershoot, duty cycle distortion (DCD) (or pulse width distortion), data dependent jitter (DDJ), periodic jitter (PJ), random jitter (RJ), power supply rejection ratio (PSRR), and electromagnetic interference (EMI) generation and susceptibility. The discrete optical data integrity parameters may also be referred to herein as optical data integrity parameters and/or data integrity parameters.

The PLL-based data transmission circuit and laser diode driver data path transmitter parameters that may be adjusted for overall optimization based on feedback may include one or more of, but are not limited to, bias current ($I_{bias}$), modulation current ($I_{mod}$), rise time peaking (pk+), fall time peaking (pk−), duty cycle distortion (DCD), PLL multiplier/recovery/re-timer loop filter time constant/bandwidth and gain.

The discrete parameter/data-eye module 212 provides the discrete optical data integrity parameters and the data-eye information 258 to the computation and compliance test module 216 for one or more of post processing, spec compliance testing, and computation of feedback parameters.

The receiver characterization module 210 should emulate a user-defined RTIA and receiver CDR (RCDR) degeneration profile. The receiver characterization module 210 receives and uses the reference clock signal 235 for clock and data recovery to emulate CDR at the receiver end. The receiver characterization module 210 receives the degenerated voltage data signal 254, and compares against the received drive signal 236 to generate a bit compare error count 256, from which the BER may be generated. The bit compare error count is provided to the computation and compliance test module 216 for one or more of post processing, spec compliance testing and computation of feedback parameters.

The computation and compliance test module 216 receives the data-eye information, the bit compare error count, the discrete optical data integrity parameters, and the discrete optical parameters, post processes them, and uses them to calculate feedback parameters 262 to provide to the PLL-based data transmission circuit 204 and the laser diode driver 206. The feedback parameters are used to adjust the drive signal 236 so as to optimize the operating characteristics of the optical communication system. This way, the reliability performance lifetime of a complete set of optical parameter values being within their optimized margin is extended (or the data eye mask compliance or BER performance is extended) during the process of subtle long-term physical reliability degradation that typically occurs in time.

The feedback parameters 262 may also be provided to the laser diode 222 and/or the optical power splitter 224. When the laser diode 222 is a tunable laser, such as, for example, MEMS-based wavelength tunable laser, the feedback parameters 262 may be used to adjust laser diode optical output characteristics, such as, for example, wavelength and/or intensity of the optical output. When the optical power splitter includes active optical components, the feedback parameters 262 may be used to adjust their characteristics. For example, the feedback parameters may be used to adjust MEMS-based filter, grating and/or isolator. For another example, the feedback parameters may also be used to adjust EAM and/or EOM in the optical power splitter.

The computation and compliance test module 216 also tests for compliance of the BER, the data-eye diagram and/or the discrete parameters to parameter values specified in a multi-source agreement or standard definition, such as, for example, IEEE Ethernet, ANSI Fibre Channel, TIA/EIA, ITU, Bellcore, Telcordia and/or SONET. For BER compliance testing, the computation and compliance test module 216 receives the reference clock signal 237, which is used to count the number of good bits received over a period of time.

IV. Transmission Driver Circuit

Figure 3:
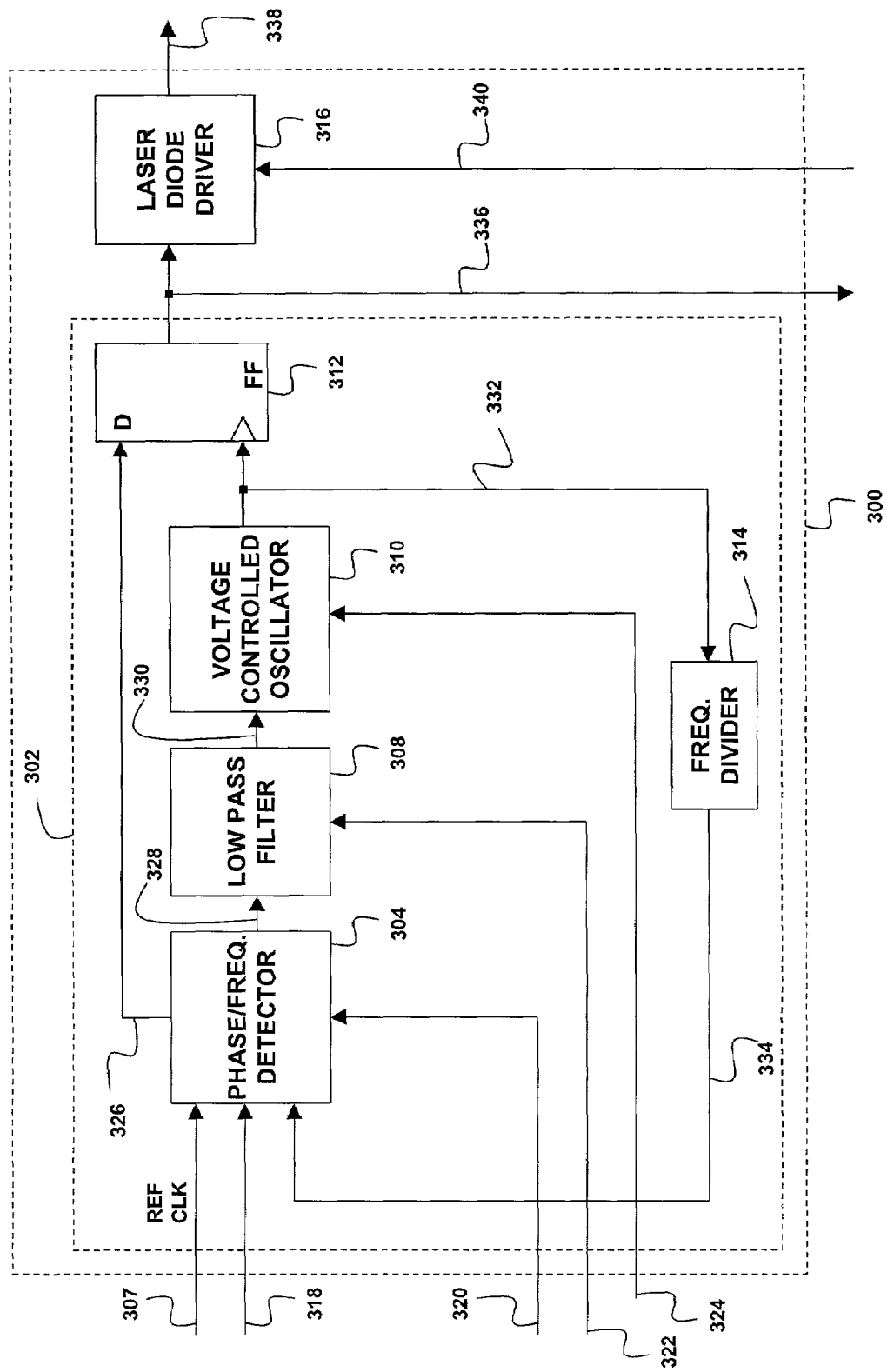
FIG. 3 is a block diagram of a PLL-based data transmission circuit in an exemplary embodiment of the present invention.

FIG. 3 is a block diagram of a transmission driver circuit 300, which may represent, for example, a more detailed illustration of the transmission driver circuit 202 of FIG. 2, in an exemplary embodiment of the present invention. The transmission driver circuit 300 includes a PLL-based data transmission circuit 302 and a laser diode driver 316. The PLL-based data transmission circuit 302 includes a phase/frequency detector (PFD) 304, a low pass filter 308, a voltage controlled oscillator (VCO) 310, a D Flip Flop 312, and a frequency divider 314. In other embodiments, the PLL-based data transmission circuit 302 may function as a multiplexer, a repeater or a retimer having one of many various different architectures, the design and applications of which are well known to those skilled in the art.

The PFD 304 receives an input data signal 318, and provides an output data signal 326 to the D Flip Flop 312. The PFD 304 also receives a reference clock signal 307. The PFD 304 uses the reference clock signal 307 for frequency and/or phase detecting/tracking. In other embodiments, the reference clock signal may be generated from within the transmission driver circuit 300.

When the input data signal 318 includes parallel data, the PLL-based data transmission circuit may include a multiplexer (e.g., clock multiplier unit), which may be used to serialize the parallel data to provide as the output data signal 326. In this case, the VCO provides a clock signal 332 with frequency that corresponds to the output data signal 326. Further, since the clock frequency is now a multiple of the clock frequency that corresponds to the input data signal 318, the frequency divider 314 is used to divide the clock signal 332 so as to enable phase/frequency comparison between the input data signal 318 and the clock signal 334. When the data rate of the input data signal is similar to the data rate of the output data signal 326, the frequency divider 314 may not be needed.

The PFD 304 provides a voltage output signal 328 to the low pass filter 308. The voltage output signal 328 includes phase/frequency difference information between the input data signal 318 and clock signal 334. The voltage output signal 328 is low pass filtered by the low pass filter 308 and provided to the VCO 310 as a voltage control signal 330, which is used to adjust the oscillation frequency of the VCO 310.

The PFD 304, the low pass filter 308 and the VCO 310 in this embodiment receive feedback signals 320, 322 and 324, respectively. The feedback signals are provided by a computation and compliance test module, such as, for example, the computation and compliance test module 216 of FIG. 2. The feedback signals are used to adjust the operating characteristics of the respective devices so as to adjust them to generate signals that improve the laser diode characteristics (e.g., improve optical quality of the laser diode output).

The feedback signal 320 includes $\Delta K_{PFD}$, which may be used to adjust the gain of the PFD 304. The $\Delta K_{PFD}$, for example, may be in terms of Volts/radians (V/RAD) since the gain is typically measured as change in voltage due to change in frequency or phase offset between the two signals being compared. The feedback signal 322 includes $\Delta T_{FILTER}$, which may be used to change response of the low pass filter 308. For example, $\Delta T_{FILTER}$ may be used to adjust resistance and/or capacitance of the low pass filter so as to change the gain and/or frequency response. The feedback signal 324 includes $\Delta K_{VCO}$, which may be used to change characteristics of the VCO 310. For example, $\Delta K_{VCO}$ may be in terms of Hz/Volts (Hz/V) since the output frequency of VCO depends on the input voltage.

The D Flip Flop 312 uses the output data signal 326 to generate a transmission data signal 336, which is provided to the laser diode driver 316. The D Flip Flop 312 also provides the transmission data signal to a receiver characterization module, such as, for example, the receiver characterization module 210 of FIG. 2, to compare against a degenerated voltage data signal, such as, for example, the degenerated voltage data signal 254 of FIG. 2.

In response to the transmission data signal 336, the laser diode driver 316 provides a drive signal 338 to a laser diode, such as, for example, the laser diode 222 of FIG. 2. The laser diode driver 316 receives a set of feedback parameters 340 from a computation and compliance test module, such as, for example, the computation and compliance test module 216 of FIG. 2.

The feedback parameters 340 may include one or more of, but are not limited to, a bias current adjustment signal ($\Delta I_{bias}$), a modulation current adjustment signal ($\Delta I_{mod}$), a positive peaking current adjustment signal ($\Delta I_{pk+}$), a negative peaking current adjustment signal ($\Delta I_{pk-}$), and a duty cycle distortion adjustment signal ($\Delta I_{dcd}$). The bias and modulation current adjustment signals are used to adjust the bias and modulation currents, $I_{bias}$ and $I_{mod}$, respectively. The duty cycle distortion adjustment signal is used to adjust pulse width so as to reduce distortion.

When the bias current is increased to increase average power, the modulation current should also be increased to maintain existing extinction ratio. The laser's relaxation oscillation frequency (ROF) may also be increased, but the peaking and the frequency response may be reduced, and thus may increase or decrease rise time while decreasing overshoot. The ROF may now show up along the rising edge and may require positive peaking, but not negative peaking because negative peaking may cause lower eye mask violation due to undershoot caused by inductance. In other instances, negative peaking may be used to overcome the laser's diffusion tails to achieve faster fall times, but not positive peaking because of an existing overshoot.

Separate positive and negative peaking current adjustment signals are provided so as to enable independent adjustment of positive and negative peaking currents, $I_{pk+}$ and $I_{pk-}$, respectively. The capability for independent adjustment of the positive and negative peaking currents may allow for optimum driving of positive and the negative peaking without overdriving the other, resulting in either undershooting or overshooting. In some cases, more negative peaking than positive peaking, or vice versa, can result in increased duty cycle distortion (DCD). However, the additional DCD may be compensated by DCD feedback and adjustment capabilities.

V. Receiver Characterization Module

Figure 4:
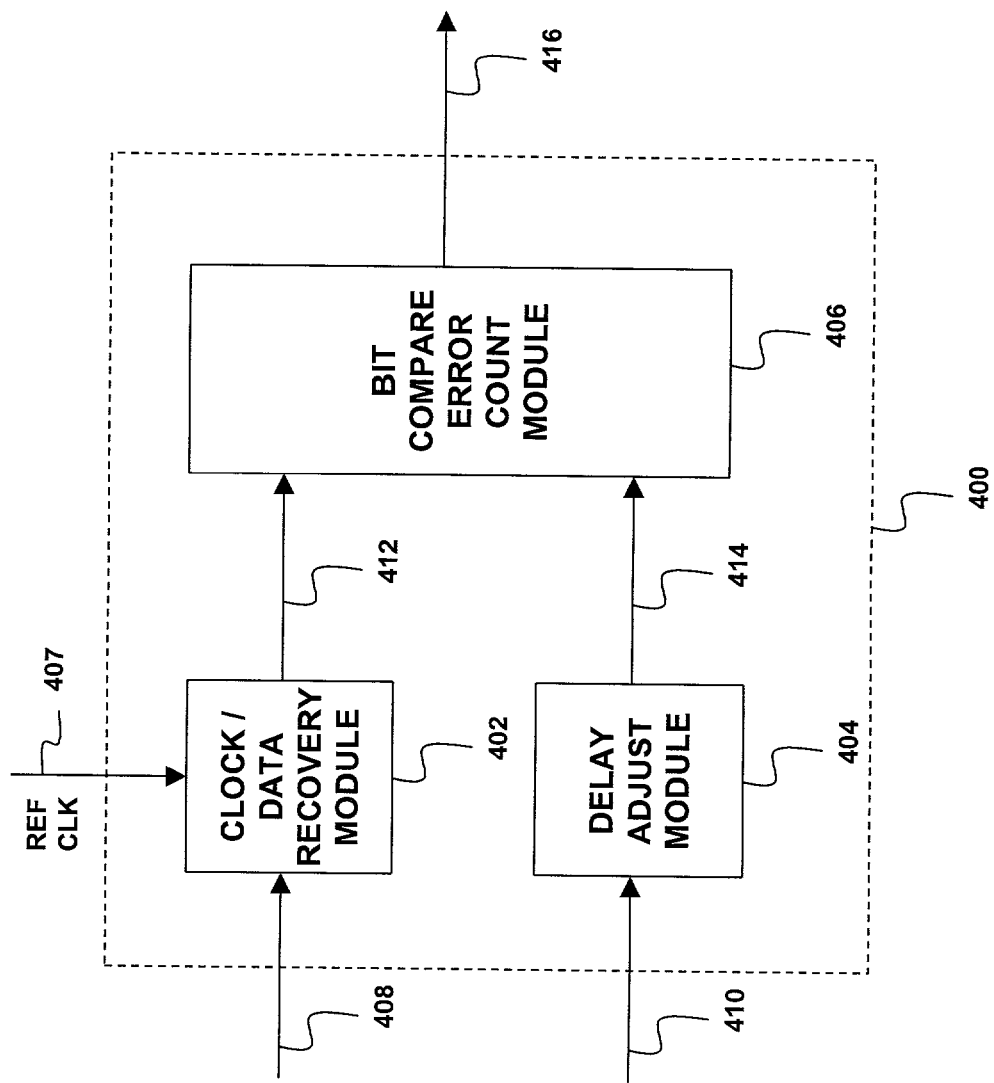
FIG. 4 is a block diagram of a receiver characterization module in an exemplary embodiment of the present invention.

FIG. 4 is a block diagram of a receiver characterization module 400, which may represent, for example, a more detailed illustration of the receiver characterization module 210 of FIG. 2, in an exemplary embodiment of the present invention. The receiver characterization module 400 includes a clock/data recovery module (CDR) 402, a delay adjust module 404 and a bit compare error count module 406.

The CDR 402, which may also be referred to as a monitor CDR, should be designed to emulate the CDR at the receiver end so as to provide a meaningful simulation of the clock and data recovered at the receiver end. Thus, the operational characteristics of the CDR 402 may be defined by the user at the time of production. The operational characteristics of the CDR may also be programmable so that it may be programmed in the field.

The CDR 402 receives a degenerated voltage data signal 408, such as, for example, the degenerated voltage data signal 254 of FIG. 2. Since the degenerated voltage data signal has been degenerated to represent channel loss through, for example, dispersion and/or attenuation, the clock and data recovered by the CDR simulates the clock and data recovered at the receiver end. The CDR 402 receives a reference clock 407 for clock and data recovery. In other embodiments, the reference clock 407 may be generated from within the receiver characterization module 400.

The CDR 402 provides a recovered data signal 412 to the bit compare error count module 406 to be compared against a delayed transmission data signal 414 provided by the delay adjust module 404. The delay adjust module 404 receives a transmission data signal 410, such as, for example, the transmission data signal 236 of FIG. 2, and delays it to adjust for delay to the recovered data signal 412 in the emulated channel and the CDR 402. By comparing the recovered data signal 412 with the delayed transmission data signal 414, the bit compare error count module 406 generates a bit compare error count 416, from which the BER may be generated. The bit compare error count 416 is provided to a computation and compliance test module, such as, for example, the computation and compliance test module 216 of FIG. 2, for post processing, compliance testing and computation of feedback parameters.

Figure 5:
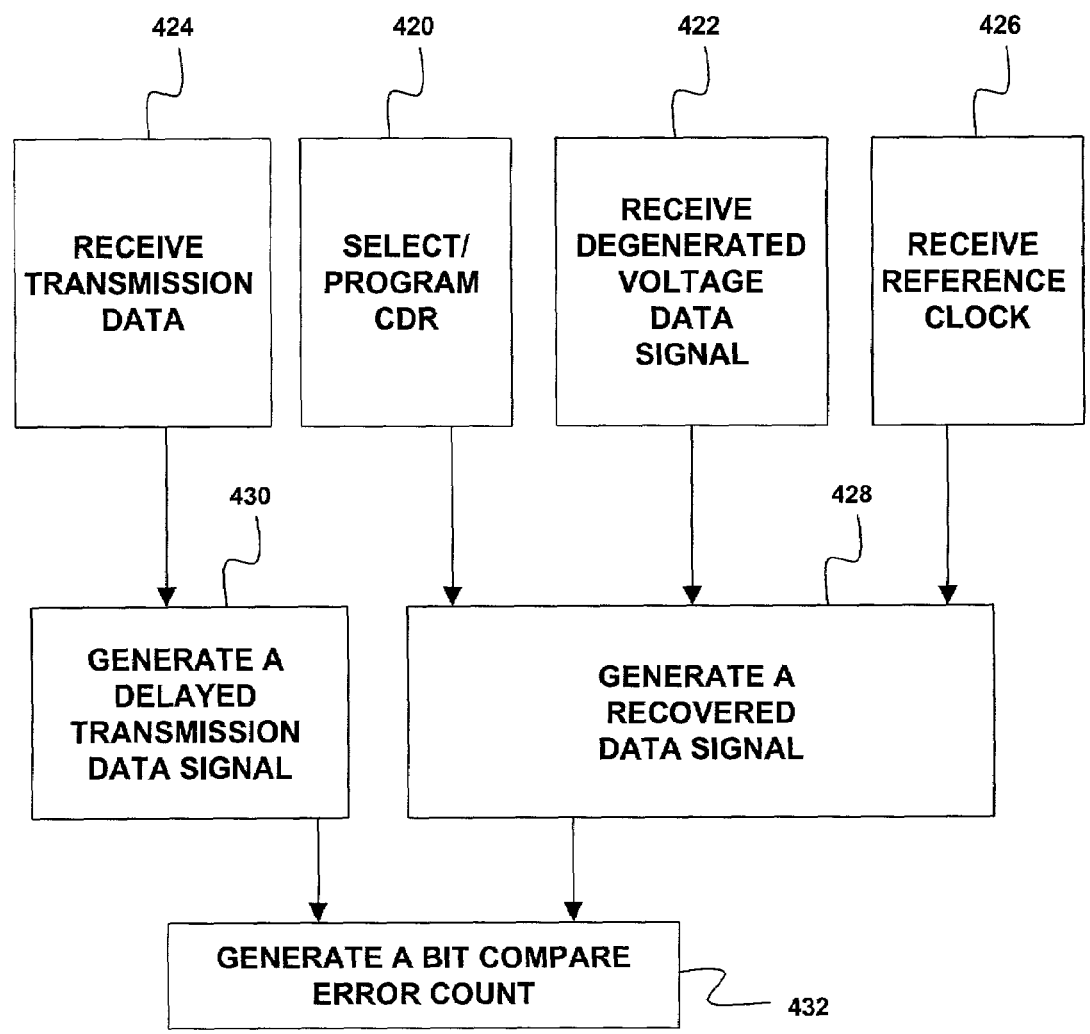
FIG. 5 is a flow diagram that illustrates a process of generating a bit compare error count in an exemplary embodiment of the present invention.

FIG. 5 is a flow diagram that illustrates a process of generating a bit compare error count in an exemplary embodiment of the present invention. The flow diagram of FIG. 5 may apply to generating a bit compare error count for each channel of a laser array as well as for a single laser.

A CDR is selected in step 420 to emulate the operational characteristics of the CDR at the receiver end. The CDR may also be programmable, and may be programmed to emulate the receiver CDR.

In step 422, the CDR receives a degenerated voltage data signal, which may represent channel loss. A reference clock received in step 426 may be used to generate a recovered data signal from the degenerated voltage data signal in step 428. Meanwhile, a transmission data signal is received in step 424 and delayed in step 430 to generate a delayed transmission data signal. In step 432, the degenerated voltage data signal is compared against the delayed transmission data signal to generate a bit compare error count. The method of generating a bit error count by comparing two voltage signals against one another is known to those skilled in the art.

VI. Discrete Parameter/Data-Eye Module

Figure 6:
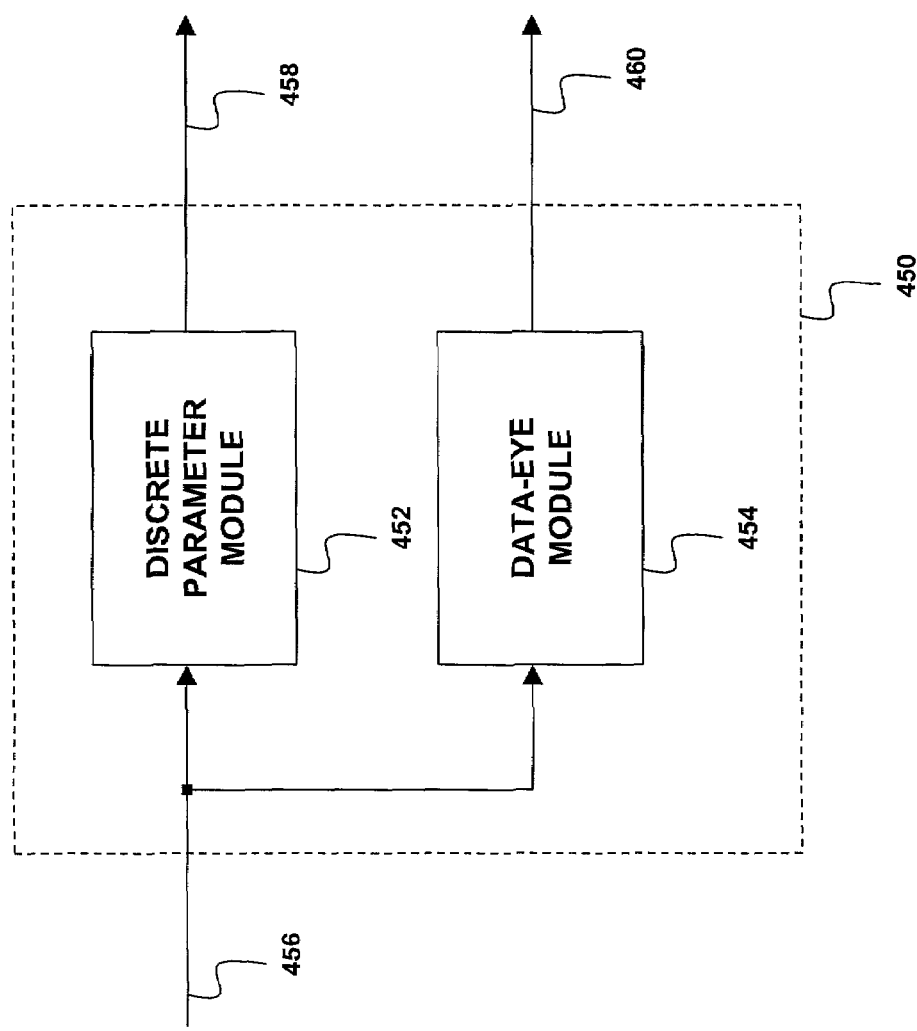
FIG. 6 is a block diagram of a discrete parameter/data-eye module in an exemplary embodiment of the present invention.

FIG. 6 is a block diagram of a discrete parameter/data-eye module 450, which may represent, for example, a more detailed illustration of the discrete parameter/data-eye module 212 of FIG. 2, in an exemplary embodiment of the present invention. The discrete parameter/data-eye module 212 includes a discrete parameter module 452 and a data-eye module 454.

The discrete parameter module 452 and the date-eye module 454 receive a degenerated voltage data signal 456, such as, for example, the degenerated voltage data signal 254 of FIG. 2. The discrete parameter module 452 uses the degenerated voltage data signal 456 to determine discrete optical data integrity parameter information. The discrete optical data integrity parameters may include one or more of, but are not limited to, $P_{ave}$, ER, OMA, rise and fall times, overshoot and undershoot, DCD, DDJ, PJ, RJ, PSRR and EMI susceptibility. The discrete parameter module 452 provides the discrete optical data integrity parameter information 458 to a computation and compliance test module, such as, for example, the computation and compliance test module 216 of FIG. 2, for post processing, spec compliance testing, and/or computation of feedback parameters.

The data-eye module 454 uses the degenerated voltage data signal to determine a data-eye 460. The data-eye 460 is provided to a computation and compliance test module, such as, for example, the computation and compliance test module 216 of FIG. 2, for post processing, spec compliance testing, and/or computation of feedback parameters. The computation and compliance test module includes eye mask information, which may be from a standard specification or may be user-defined. The data-eye 460 may be compared against the eye mask to determine compliance.

Figure 7:
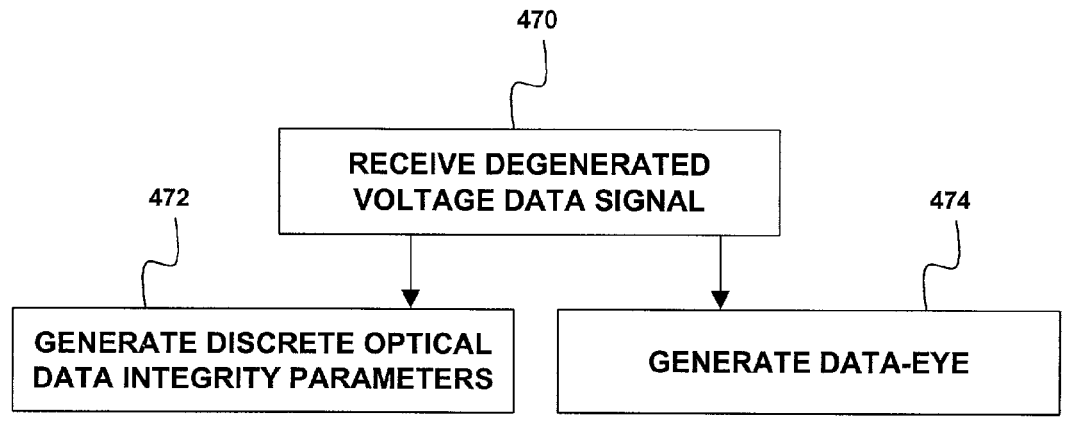
FIG. 7 is a flow diagram that illustrates a process of generating discrete optical data integrity parameters and a data-eye.

FIG. 7 is a flow diagram that illustrates a process of generating discrete optical data integrity parameters and a data-eye. The flow diagram of FIG. 7 may apply to generating discrete optical data integrity parameters and a data-eye for each channel of a laser array as well as for a single laser.

A degenerated voltage data signal is received in step 470. Then the degenerated voltage data signal is used in steps 472 and 474, respectively, to generate discrete optical data integrity parameters and a data-eye. The method of generating discrete optical data integrity parameters and a data-eye using a data signal is known to those skilled in the art.

VII. Channel Characterization Module

Figure 8:
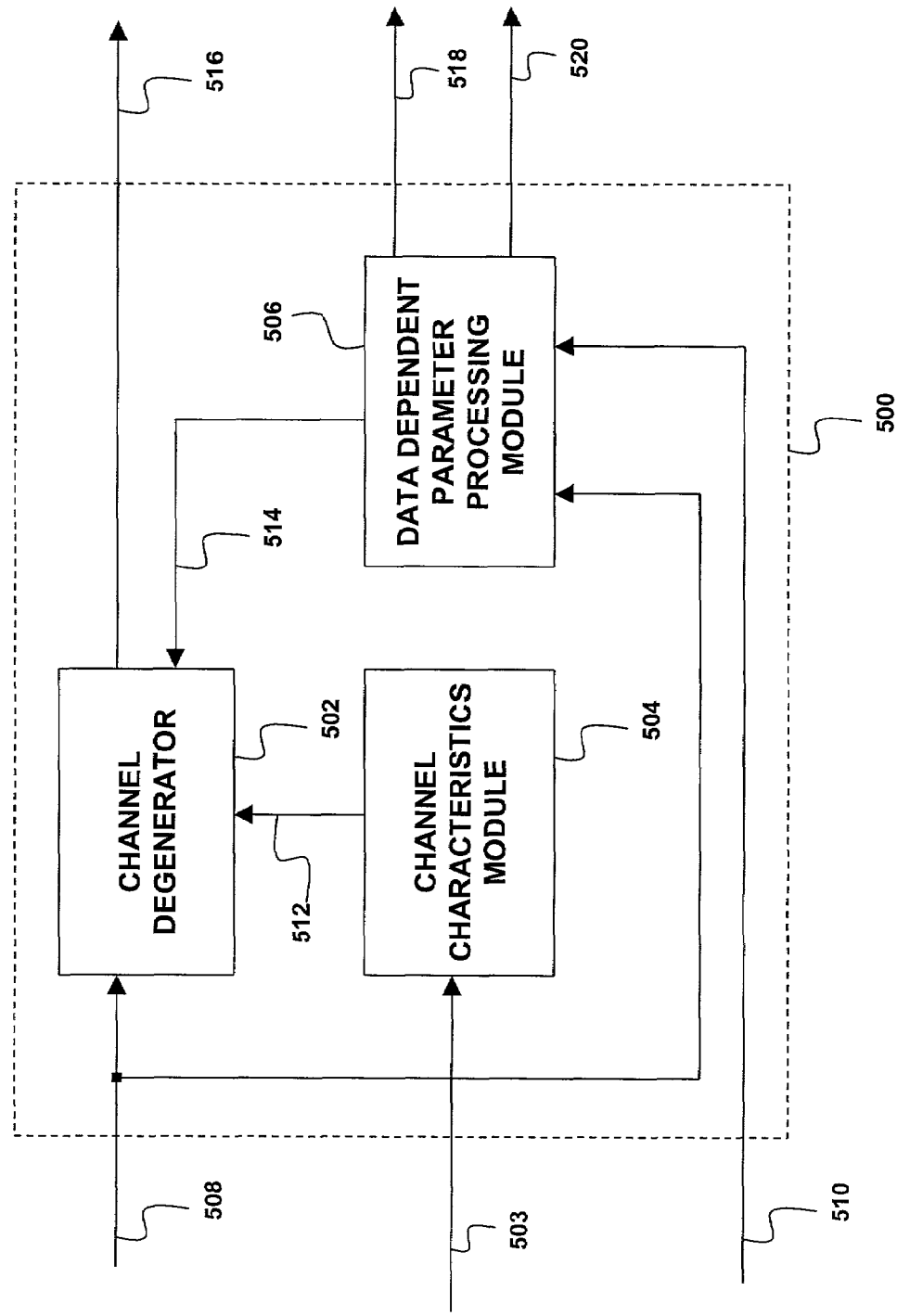
FIG. 8 is a block diagram of a channel characterization module in an exemplary embodiment of the present invention.

FIG. 8 is a block diagram of a channel characterization module 500, which may represent, for example, a more detailed illustration of the channel characterization module 214 of FIG. 2, in an exemplary embodiment of the present invention. The channel characterization module 500 includes a channel degenerator 502, channel characteristics module 504 and a data dependent parameter processing module 506.

The channel degenerator 502 emulates degeneration of the transmission data signal due to inherent channel characteristics, such as, for example, dispersion and attenuation through the communication medium. Therefore, the channel degenerator receives one or more high frequency voltage data signals 508, such as, for example, the voltage data signal 250 of FIG. 2, and provides a degenerated voltage data signal 516 to a receiver characterization module and a discrete parameter/data-eye module, such as, for example, the receiver characterization module 210 and the discrete parameter/data-eye module 212 of FIG. 2.

To degenerate the voltage data signal, the channel degenerator 502 receives information for emulating the channel, e.g., fiber optic channel, from the channel characteristics module 504 and the data dependent parameter processing module 506. The channel characteristics module 504 includes user-defined channel characteristics including one or more of, but are not limited to, fiber chromatic, fiber modal and fiber polarization properties (e.g., due to index of refraction profile of fiber).

The user-defined channel characteristics may be programmable so that new channel characteristics can be programmed onto the channel characteristics module 504 when it is desirable to emulate a new communication channel. The channel characteristics module 504, for example, may be programmed via a programming input 503. The channel characteristics module 504 provides the user-defined channel characteristics 512 to the channel degenerator 502 for channel emulation.

The data dependent parameter processing module 506 provides discrete optical parameters 514 to the channel degenerator 502. The discrete optical parameters may include one or more of, but are not limited to, λc, dλrms, SMSR, polarization, MN, MPN, chirping and RIN. The values for the discrete optical parameters typically depend on the modulation of the data on the channel. For example, transmitted data that has a slow rate of transitioning between high and low states would typically have discrete optical parameters that are different from transmitted data that has a faster rate of transitioning between high and low states. Thus, the voltage data signals 508 are provided to the data dependent parameter processing module 506 to provide modulation information.

The data dependent parameter processing module 506 also receives one or more low frequency voltage data signals 510, such as, for example, the voltage data signal 252 of FIG. 2, to be used for determination of the discrete optical parameters. The voltage data signals 510 may include multiple split optical signals, for example, to provide multi-dimensional image of the transmitted optical signal. The voltage data signals 510 may also include λc, for example, which may then be provided to the channel degenerator 502 to emulate fiber dependence on launch and λ.

The data dependent parameter processing module 506 provides the discrete optical parameters 514 to the channel degenerator 502 for channel degeneration emulation. The data dependent parameter processing module also provides the discrete optical parameters 518 to a computation and compliance test module, such as, for example, the computation and compliance test module 216 of FIG. 2, for post processing, spec compliance testing and/or computation of feedback parameters. The data dependent parameter processing module may also provide a MEMS-based device adjustment signal 520 to MEMS-based active optical components for their adjustments.

Figure 9:
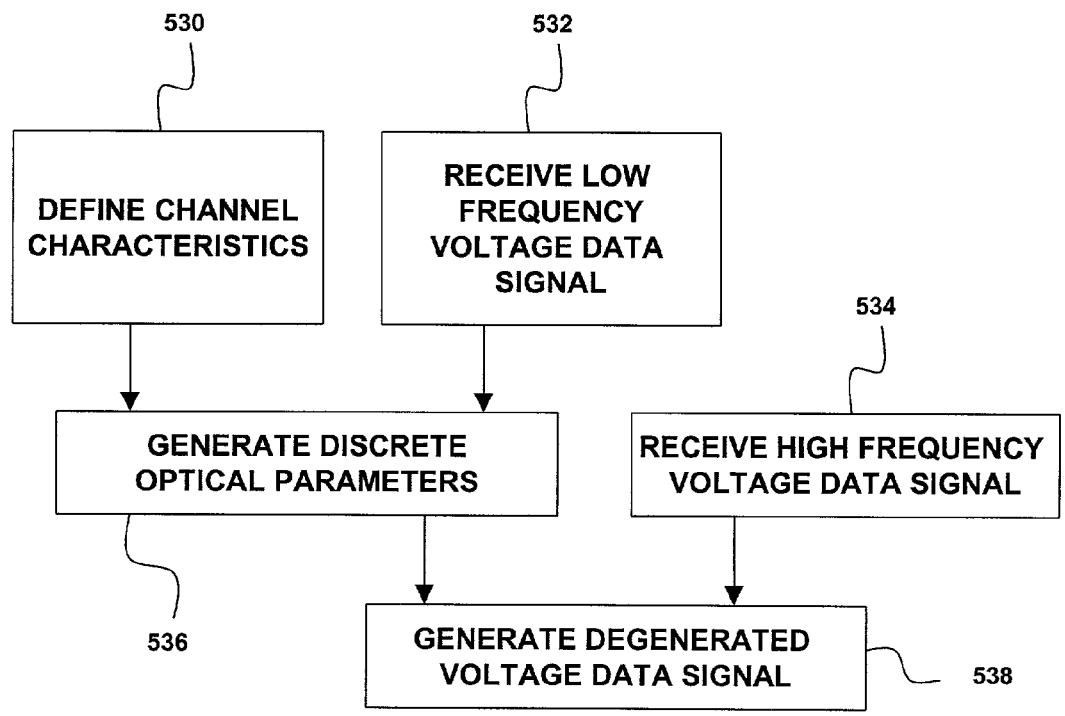
FIG. 9 is a flow diagram that illustrates a process of generating a degenerated voltage data signal and discrete optical parameters in an exemplary embodiment of the present invention.

FIG. 9 is a flow diagram illustrating a process of generating a degenerated voltage data signal and discrete optical parameters in an exemplary embodiment of the present invention. The flow diagram of FIG. 9 may apply to generating a degenerated voltage data signal and discrete optical parameters for each channel of a laser array as well as for a single laser.

In step 530, channel characteristics of the communication channel are defined. The channel characteristics are typically user-defined and may be pre-defined and/or programmed later.

In step 532, a low frequency voltage data signal is received. The low frequency voltage data signal is used together with the channel characteristics in step 536 to generate discrete optical parameters. Meanwhile in step 534, high frequency voltage data signal is received. The high frequency voltage data signal may be used together with the channel characteristics to generate a degenerated voltage data signal in step 538.

VIII. Computation and Compliance Test Module

Figure 10:
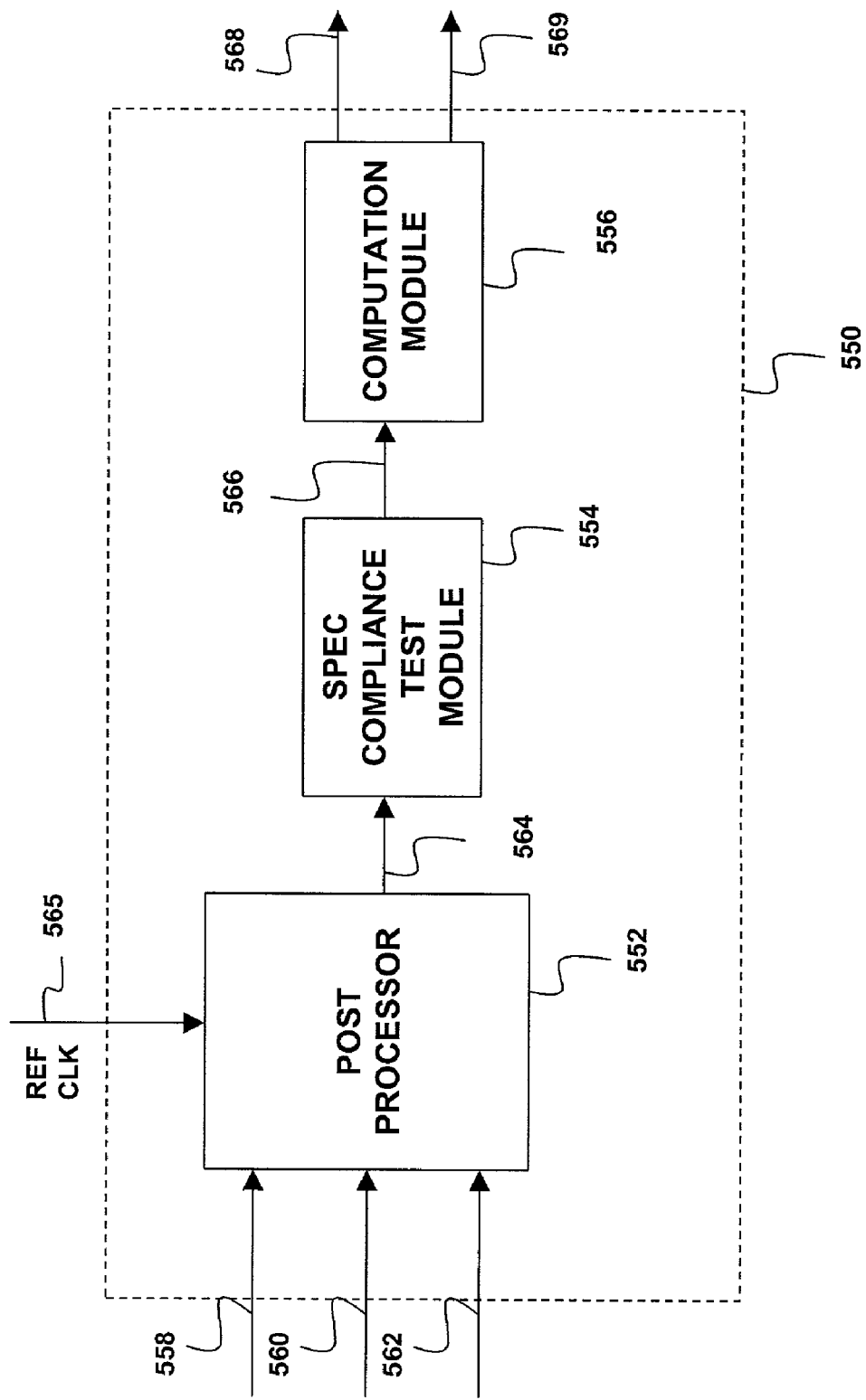
FIG. 10 is a block diagram of a computation and compliance test module in am exemplary embodiment of the present invention.

FIG. 10 illustrates a block diagram of a computation and compliance test module 550, which may represent, for example, a more detailed illustration of the computation and compliance test module 216 of FIG. 2, in an exemplary embodiment of the present invention. The computation and compliance test module 550 includes a post processor 552, a spec compliance test module 554 and a computation module 556.

The post processor 552 may have functions including one or more of, but are not limited to, sampling, holding in memory, integrating, differentiating, comparing and correlating. The post processor performs these and other functions to perform BER tester (BERT) functions, oscilloscope functions, and other functions for placing bit compare error count data, discrete optical data integrity parameters, discrete optical parameters, data-eye and other relevant data in a format suitable for spec compliance testing and/or computation of feedback parameters.

In other embodiments, the functions performed by the post processor 552 may be distributed to other components in the optical transmitter driver that includes the computation and test compliance module 550. For example, referring back to FIG. 2, the receiver characterization module 210 may include BERT functions, and the discrete parameter/data-eye module 212 and the channel characterization module 214 may include oscilloscope functions.

The post processor 552 receives a bit compare error count 558 from a receiver characterization module, such as, for example, the receiver characterization module 210 of FIG. 2. The post processor processes the bit compare error count to generate the corresponding BER and provides in an input 564 to the spec compliance test module 554 and the computation module 556. For BER generation, among other things, the post processor 552 receives a reference clock signal 565. In other embodiments, the computation and compliance test module 550 may generate the reference clock signal from within.

The post processor 552 also receives discrete optical data integrity parameters and a data-eye 560 from a discrete parameter/data-eye module, such as, for example, the discrete parameter/data-eye module 212 of FIG. 2. The post processor 552 processes the discrete optical data integrity parameters and the data eye, and provides them in the input 564 to the spec compliance test module 554 and the computation module 556.

The post processor 552 also receives discrete optical parameters 562 from a channel characterization module, such as, for example, the channel characterization module 214 of FIG. 2. The post processor processes the discrete optical parameters, and provides them in the input 564 to the spec compliance test module 554 and the computation module 556.

The spec compliance test module 554 and the computation module 556 receive data-eye and compares the data-eye against user-defined data-eye mask.

The computation module 556 receives the input 566, which may include, but is not limited to, one or more of the BER, the data-eye, the discrete optical data integrity parameters and the discrete optical parameters. The input 566 may also include spec compliance test results generated by the spec compliance test module 554.

Using the input 566, the computation module generates feedback voltages and currents 569, which may include one or more of, but are not limited to, $\Delta K_{PFD}$, $\Delta T_{FILTER}$, $\Delta K_{VCO}$, $\Delta I_{bias}$, $\Delta I_{mod}$, $\Delta I_{pk+}$, $\Delta I_{pk-}$ and $\Delta I_{dcd}$. The computation module 556 provides $\Delta K_{PFD}$, $\Delta T_{FILTER}$ and $\Delta K_{VCO}$ to a PLL-based data transmission circuit, such as, for example, the PLL-based data transmission circuit 204 of FIG. 2. In addition, the computation module 556 provides $\Delta I_{bias}$, $\Delta I_{mod}$, $\Delta I_{pk+}$, $\Delta I_{pk-}$ and $\Delta I_{dcd}$ to a laser diode driver, such as, for example, the laser diode driver 206 of FIG. 2. The generation of these feedback parameters using the BER, the data-eye, the discrete optical data integrity parameters and/or the discrete optical parameters are known to those skilled in the art.

The spec compliance test module 554 receives the input 564, which may include, but is not limited to, one or more of the BER, the data-eye, the discrete optical data integrity parameters and the discrete optical parameters. Using the input 564, the spec compliance and test module 554 determines whether the BER, the data-eye, the discrete optical data integrity parameters and/or the discrete optical parameters are within the limits specified in the specification being considered for compliance. The specifications may correspond to one or more of a multi-source agreement or standard definition, such as, for example, IEEE Ethernet, ANSI Fibre Channel, TIA/EIA, ITU, Bellcore, Telcordia and/or SONET.

The spec compliance test module 554 generates an output signal 566 to indicate compliance to the specification for which the parameters are being tested. The output signal 566 may also include one or more parameters from the input 564.

In other embodiments, the computation module 556 may receive the input 564 rather than having the parameters provided by the spec compliance test module 554 in the output signal 566.

When one or more parameters do not comply with the relevant specification, the spec compliance test module indicates no compliance in the output signal 566. The spec compliance test results in the output signal 566 may be provided as an output 568 from the computation module 556 to a receiver characterization module, a discrete parameter/data-eye module and a channel characterization module, such as, for example, the receiver characterization module 210, the discrete parameter/data-eye module 212 and the channel characterization module 214, respectively, of FIG. 2. In other embodiments, the spec compliance test results may be output directly rather than going through the computation module 556. The components that receive the output signal 568 that indicates non-compliance may adjust the parameters for compliance.

Figure 11:
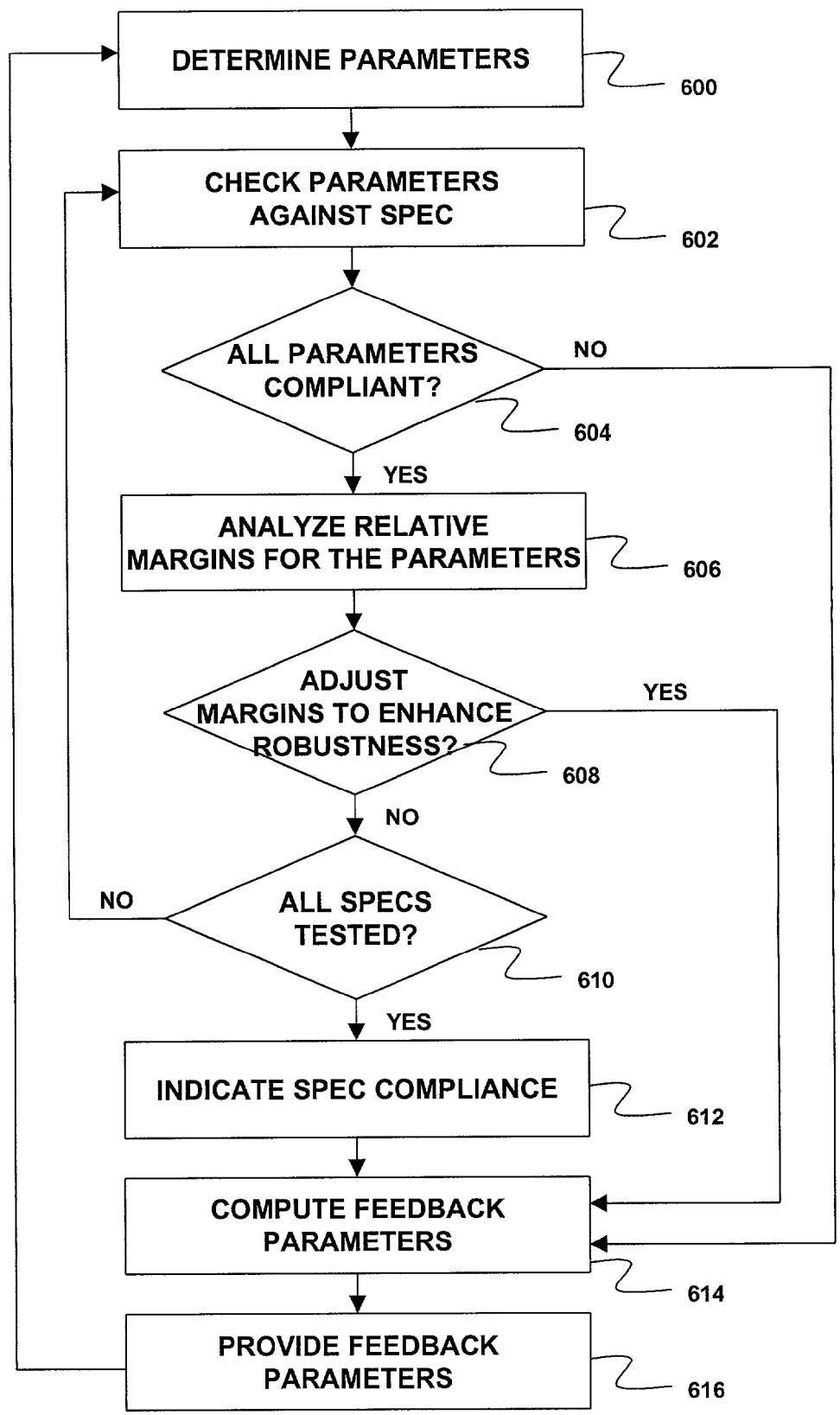
FIG. 11 is a flow diagram that illustrates testing of the parameters for compliance in an exemplary embodiment of the present invention.

FIG. 11 is a flow diagram that illustrates how parameter values are tested for compliance in an exemplary embodiment of the present invention. The parameter values may include one or more of, but are not limited to, the BER, the data-eye, the discrete optical data integrity parameters and the discrete optical parameters. The flow diagram of FIG. 11 may apply to compliance testing for each channel of a laser array as well as for a single laser.

In step 600, the parameters are determined using lower-powered (feedback) portions of the optical data signal. The lower-powered portions of the optical data signal are generated using an optical power splitter. In step 602, the parameters are compared with the spec-specified parameter values to check for compliance. In the specifications, the parameter values typically specify a range of values between an upper limit and a lower limit. If one or more parameters do not fall within the spec-specified limits in step 604, feedback parameters are computed in step 614 to adjust the parameter values to be within the spec-specified limits.

If, however, all parameters are spec-compliant in step 604, an analysis is performed on the parameters in step 606 to determine relative margins of the parameters. The relative margins of the parameters are determined because different parameters typically pass the spec compliance test with different margins (to upper limit or lower limit). Thus, it is possible for a particular parameter to pass the spec compliance test by only a few percent of the limit value, while all of the other parameters pass the compliance test by a large percent of each of their limit values.

This difference in relative margins may result in a product (e.g., integrated circuit) that meets the specification but is lacking in robustness. For example, when one or more parameters pass the spec-compliance test with low margin, they may be more susceptible to changes in external conditions, and may cause an unsatisfactory BER with small shifts in external conditions. In an exemplary embodiment of the present invention, different margins are determined for different parameters based on, for example, their relative weight in deriving the BER. Then, product yields may be improved by identifying the low and high margin test values and then attempting to compensate the parameters with relatively low margins by degenerating the parameters with relatively high margins.

Therefore, if there are substantial differences between relative margins for different parameters, a determination is made in step 608 to compute feedback parameters in step 614 to increase the margins for the low-margin parameters at the risk of potentially degenerating parameters with relatively higher margins. The parameter margins for any ambient or application specific worst-case conditions may also be programmed into a computation and compliance test module. In one embodiment of the present invention, a weighted feedback scheme for improving tolerance margin of each and all parameters may be pre-programmed. In step 616, the computed feedback parameters are provided to optimize the characteristics of the optical data signal to be transmitted over the channel, e.g., a fiber optic channel.

If there is no substantial difference between relative margins for different parameters, the process in step 610 checks whether the spec compliance testing has been conducted for all specifications being considered. If spec compliance testing has been passed for all specifications, the process indicates spec compliance in step 612, and may compute and provide feedback parameters in steps 614 and 616, respectively. Of course, the feedback parameters may not be used for any changes if all spec compliance tests pass and all the margins for the parameters are acceptable. If one or more specifications remain to be complied with, the process returns to step 602 to check the parameters against the next specification.

This optimization based on feedback may constantly occur in real-time. The adjustment process may eventually reach a point in time where an overall performance optimization occurs where one of the computed, weighted discrete parameter values will have the lowest margin of all discrete parameters while all of the other computed discrete parameter values maintain a higher margin. During the adjustment process, each of the discrete parameters may have been each increased or decreased in their marginal value. The overall data-eye may reach the best overall margin that may be achieved or a programmed specification limit. In any case, the adjustment process ultimately maintains the program defined BER with the best obtainable margin within the BER programmed limit. This adjustment process may be applicable over all S/N degenerative constituents previously defined and process variation that affects the properties of integrated circuit (IC) devices, where process variation may be calibrated out with known external devices, voltage, current, or light level.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

For example, the embodiments of the present invention have been described mainly in reference to applications in optical communication systems. However, the embodiments of the present invention may broadly be applied to cellular/wireless/satellite communication systems or other suitable communication systems. In a wireless communication system, the transmission medium may be free space, the transmitter may include a modulator and transmitter antenna, and the monitor detector may include a monitor antenna. In addition the TIA may be replaced with a low noise amplifier (LNA), and the CDR may be replaced with a demodulator.

For another example, in the described embodiments, no provision for manually monitoring input, output and internal signals of the self-adjusting transmitter driver or the optical transmitter driver has been explicitly disclosed. However, in one or more embodiments of the present invention, one or more test points may be provided to monitor input, output and internal signals such as, for example, the signals containing discrete parameters, data-eye information, bit compare error count and feedback parameters.

The invention claimed is:

1. A transmitter for transmitting a data signal, the transmitter comprising:
 a driver circuit for generating a drive signal, the driver circuit being capable of adjusting the drive signal in response to at least one feedback signal;
 a data transmitter for receiving the drive signal and for generating the data signal in response to the drive signal;
 a power splitter for splitting the data signal into at least first and second low powered data signal portions and a high powered data signal;
 a first sensor capable of detecting the first low powered data signal to generate a first signal containing high frequency characteristics;
 a second sensor capable of detecting the second low powered data signal to generate a second signal containing source parameters; and
 a processor for receiving the first and second signals, for generating said a feedback signal in response to the first and second signals, and for providing said a feedback signal to the driver circuit.

2. The transmitter according to claim 1, wherein the data signal comprises at least one selected from a group consisting of an analog signal and a digital signal.

3. The transmitter according to claim 1, wherein the driver circuit, the data transmitter, the first and second sensors and the processor are fabricated on a common semiconductor substrate.

4. The transmitter according to claim 1, wherein the data transmitter comprises a laser, and the data signal comprises an optical data signal.

5. The transmitter according to claim 1, wherein the first sensor has at least as high bandwidth characteristics as a sensor expected to be provided at a receiver end to detect the data signal.

6. The transmitter according to claim 1, wherein the first sensor has at least as low noise characteristics as a sensor expected to be provided at a receiver end to detect the data signal.

7. The transmitter according to claim 1, wherein the first sensor has at least one selected from a group consisting of lower bandwidth characteristics and higher noise characteristics as compared to a sensor expected to be provided at a receiver end, and wherein at least one of said lower bandwidth characteristics and said higher noise characteristics is compensated through equalization.

8. The transmitter according to claim 1, wherein the data transmitter comprises a laser diode for receiving the drive signal, wherein the drive signal comprises an electrical drive signal, said laser diode for generating an optical data signal, the optical data signal includes at least one non-optimum parameter selected from a group consisting of a bit error rate, a data-eye, data integrity parameters and discrete optical parameters, the drive signal including a plurality of currents, and wherein at least one of the plurality of currents is varied towards optimizing said at least one non-optimum parameter.

9. The transmitter according to claim 8, wherein the data integrity parameters comprise at least one selected from a group consisting of average power (Pave), extinction ratio (ER), optical modulation amplitude (OMA), rise and fall times, overshoot and undershoot, duty cycle distortion (DOD), data dependent jitter (DDJ), periodic jitter (PJ), random jitter (RJ), power supply rejection ratio (PSRR), and electromagnetic interference (EMI) generation and susceptibility.

10. The transmitter according to claim 8, wherein the discrete optical parameters comprise at least one selected from a group consisting of center wavelength ($\lambda c$), spectral width ($d\lambda rms$), sidemode suppression ratio (SMSR), is polarization, modal noise (MN), mode partition noise (MPN), chirping, relative intensity noise (RIN), beam divergence angle ($\Delta\Theta$) and optical return loss (ORL).

11. The transmitter according to claim 8, wherein the plurality of currents comprise at least one selected from a group consisting of a bias current (Ibias), a modulation current (Imod), a rise time peaking (pk+) current, a fall time peaking (pk−) current and a duty cycle distortion (DOD) current.

12. The transmitter according to claim 1, wherein the data signal is provided to a transmission medium for receipt by a receiving end, a portion of the transmitted data signal is reflected back from the receiving end, at least one of the first and second sensors is capable of detecting the reflected back signal, and wherein the processor uses the reflected back signal to generate said at least one feedback signal.

13. The transmitter according to claim 12, wherein a data-eye of the data signal is compared against the data-eye of the reflected back signal to determine the data-eye of the transmitted data signal expected to be detected at the receiving end.

14. A transmitter for transmitting a data signal, the transmitter comprising:
   a driver circuit for generating a drive signal, the driver circuit being capable of adjusting the drive signal in response to at least one feedback signal;
   a data transmitter for receiving the drive signal and for generating the data signal in response to the drive signal;
   a first sensor capable of detecting the data signal to generate a first signal containing a first characteristic;
   a second sensor capable of detecting the data signal to generate a second signal containing a second characteristic; and
   a processor for receiving at least one of the first and second signals, for generating said at least one feedback signal in response to at least one of the first and second characteristics, and for providing said at least one feedback signal to the driver circuit,
   wherein the processor comprises means for emulating channel degeneration, said channel degeneration emulating means being capable of degenerating the first signal based on said at least one feedback signal to generate a degenerated data signal, which emulates the data signal as detected at a receiver end.

15. The transmitter according to claim 14, wherein the processor further comprises means for emulating a data receiver at the receiver end, and wherein said receiver emulating means receives the degenerated data signal and the drive signal, generates a recovered drive signal by applying the degenerated data signal to the emulation of the data receiver, and compares the recovered drive signal with the drive signal to generate a bit compare error count.

16. The transmitter according to claim 15, wherein the processor is capable of performing bit error rate (BER) testing using the bit compare error count.

17. The transmitter according to claim 16, wherein the processor further comprises means for generating at least one selected from a group consisting of discrete optical parameters, data integrity parameters and a data-eye, using at least one of the first and second signals.

18. The transmitter according to claim 17, wherein the processor is capable of performing spec compliance testing using at least one selected from a group consisting of the discrete optical parameters, the bit compare error count, the data integrity parameters and the data-eye.

19. The transmitter according to claim 18, wherein one or more of said discrete optical parameters and data integrity parameters are compared against limit values specified in one or more specifications during the spec compliance testing.

20. The transmitter according to claim 17, wherein the processor is capable of comparing the data-eye against a data-eye mask.

21. A transmitter for transmitting a data signal, the transmitter comprising:
   a driver circuit for generating a drive signal, the driver circuit being capable of adjusting the drive signal in response to at least one feedback signal;
   a data transmitter for receiving the drive signal and for generating the data signal in response to the drive signal;
   a first sensor capable of detecting the data signal to generate a first signal containing a first characteristic;
   a second sensor capable of detecting the data signal to generate a second signal containing a second characteristic; and
   a processor for receiving at least one of the first and second signals, for generating said at least one feedback signal in response to at least one of the first and second characteristics, and for providing said at least one feedback signal to the driver circuit,
   wherein the driver circuit comprises a phase locked loop (PLL), and wherein at least one of the feedback signals is used to adjust bandwidth and gain of the PLL.

22. The transmitter according to claim 21, wherein the PLL receives a reference clock signal, the reference clock signal contains jitter noise, and wherein the feedback signal is used to vary the bandwidth and gain of the PLL so as to filter out the jitter noise.

23. The transmitter according to claim 21, wherein the data transmitter comprises a laser diode, the PLL receives an input data signal and is used to generate a control data signal based on the input data signal, the driver circuit further comprises a laser diode driver for receiving the control data signal and for generating the drive signal, the laser diode receives the drive signal to generate the data signal, the data signal comprises an optical data signal, and wherein high speed parameters of the PLL and high speed parameters of the laser diode driver are used together towards optimizing the quality of the optical data signal, and wherein the control data signal comprises at least one selected from a group consisting of a voltage signal and a current signal.

24. The transmitter according to claim 23, wherein the PLL receives a reference clock signal, the reference clock signal contains jitter noise, wherein the jitter noise is passed to the driver circuit in the control data signal and then to the laser diode in the drive signal, wherein the optical data signal includes the jitter noise, and wherein the jitter noise in the optical data signal is reduced by varying bandwidth and gain of the PLL using at least one of the feedback signals.

25. A method of adjusting signal quality of a data signal provided by a transmitter, the method comprising:
   generating a drive signal;
   generating the data signal in response to the drive signal;

transmitting said data signal into a power splitter thereby simultaneously splitting the data signal to at least first and second low powered data signal portions and a high powered data signal;

detecting the first low Dowered data signal portion using a first sensor, said first sensor generating a first signal containing a high frequency characteristic;

detecting the second low powered data signal portion using a second sensor, said second sensor generating a second signal containing a source parameter;

generating at least one feedback signal in response to the first and second low powered signals; and adjusting the drive signal in response to said at least one feedback signal.

26. The method according to claim 25, wherein generating the data signal comprises generating an optical data signal.

27. The method according to claim 25, further comprising degenerating the first signal by emulating channel degeneration and applying the first signal to the emulation of channel degeneration, wherein the degenerated first signal emulates the data signal as detected by a sensor at a receiver end.

28. The method according to claim 27, further comprising:

emulating a data receiver expected to be provided at a receiver end;

generating a recovered drive signal by applying the degenerated first signal to the emulation of the data receiver;

delaying the drive signal; and comparing the recovered drive signal against the delayed drive signal to generate a bit compare error count.

29. The method according to claim 28, further comprising generating at least one selected from a group consisting of discrete optical parameters, data integrity parameters and a data-eye, using at least one of the first and second signals.

30. The method according to claim 29, the method further comprising performing spec compliance testing using at least one selected from a group consisting of the discrete optical parameters, the bit compare error count, the data integrity parameters and the data-eye.

31. The method according to claim 30, wherein performing spec compliance testing comprises comparing at least one of said discrete optical parameters and data integrity parameters against corresponding limit values specified in at least one specification.

32. The method according to claim 29, further comprising comparing the data-eye against a data-eye mask.

33. The method according to claim 28, further comprising performing bit error rate (BER) testing using the bit compare error count.

34. A transmitter for transmitting a plurality of data signals, the transmitter comprising:

a driver circuit for generating a plurality of drive signals, the driver circuit being capable of adjusting the drive signals in response to a plurality of feedback signals, at least one feedback signal corresponding to each drive signal;

a data transmitter for receiving the drive signals and for generating the data signals in response to the drive signals;

a power splitter for splitting each of the data signals into at least first and second low powered data signal portions and a high powered data signal;

a plurality of first sensors, each first sensor being capable of detecting one of the first low powered data signals to generate a corresponding one of a plurality of first signals containing high frequency characteristics;

a plurality of second sensors, each second sensor being capable of detecting one of the second low powered data signals to generate a corresponding one of a plurality of second signals containing source parameters; and a processor for receiving the first signals and the second signals, for generating the feedback signals in response to the first and second signals, and for providing the feedback signals to the driver circuit.

35. The transmitter according to claim 34, wherein the data transmitter comprises a laser array for receiving the drive signals and for generating the data signals, wherein the data signals comprise optical data signals, and wherein the feedback signals are used to adjust optical quality of the optical data signals.

* * * * *